(12) United States Patent
Marshall et al.

(10) Patent No.: US 9,700,818 B2
(45) Date of Patent: Jul. 11, 2017

(54) VENTED LIQUID FILTER VENTED THROUGH MEDIA

(75) Inventors: James N. Marshall, Elm Creek, NE (US); Timothy L. Krull, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 952 days.

(21) Appl. No.: 13/332,035

(22) Filed: Dec. 20, 2011

(65) Prior Publication Data

US 2012/0168359 A1 Jul. 5, 2012

Related U.S. Application Data

(60) Provisional application No. 61/428,337, filed on Dec. 30, 2010.

(51) Int. Cl.
| | | |
|---|---|---|
| *B01D 21/30* | (2006.01) | |
| *B01D 29/00* | (2006.01) | |
| *B01D 29/21* | (2006.01) | |
| *B01D 36/00* | (2006.01) | |
| *B01D 35/153* | (2006.01) | |

(Continued)

(52) U.S. Cl.
CPC ........... *B01D 29/21* (2013.01); *B01D 35/153* (2013.01); *B01D 35/1576* (2013.01); *B01D 36/001* (2013.01); *B01D 36/006* (2013.01); *B01D 35/16* (2013.01); *B01D 2201/0415* (2013.01); *B01D 2201/291* (2013.01); *B01D 2201/305* (2013.01); *B01D 2201/316* (2013.01); *B01D 2201/347* (2013.01)

(58) Field of Classification Search
None
See application file for complete search history.

(56) References Cited

U.S. PATENT DOCUMENTS

| 4,368,118 | A | * | 1/1983 | Siposs ........................... 210/136 |
|---|---|---|---|---|
| 4,529,512 | A | * | 7/1985 | Williamson et al. ......... 210/120 |
| 5,489,384 | A | | 2/1996 | Janik et al. |

(Continued)

FOREIGN PATENT DOCUMENTS

| DE | 25 55 420 B1 | 4/1977 |
|---|---|---|
| DE | 43 30 840 C1 | 2/1995 |

(Continued)

*Primary Examiner* — Terry Cecil
(74) *Attorney, Agent, or Firm* — Reinhart Boerner Van Deuren P.C.

(57) ABSTRACT

A filter apparatus and filter element therefore are provided. The filter apparatus includes a filter head including an inlet port, a main flow outlet port and a drain flow outlet port. The filter element includes a ring of filter media defining an internal cavity. The filter element defines a main flow passage and a drain flow passage through the internal cavity. Each flow passage has an inlet on a clean side of the filter media directly fluidly communicating with the internal cavity. The main flow passage is fluidly coupled to the main flow outlet port. The drain flow passage (or air bleed passage) is fluidly coupled to the drain flow outlet port and includes (i) a restriction 154 sized large enough to allow air flow and small enough to prevent substantial liquid flow and (ii) a check valve 912 limiting flow to a single direction. The filter media separates the inlet port from the main flow and drain flow outlet ports.

22 Claims, 20 Drawing Sheets

(51) Int. Cl.
*B01D 35/157* (2006.01)
*B01D 35/16* (2006.01)

(56) References Cited

U.S. PATENT DOCUMENTS

| | | | |
|---|---|---|---|
| 7,147,110 | B2 | 12/2006 | Clausen et al. |
| 7,572,306 | B2 * | 8/2009 | Hawkins et al. ............... 55/310 |
| 2005/0023209 | A1 | 2/2005 | Clausen |
| 2008/0164188 | A1 * | 7/2008 | Jensen et al. ................. 210/120 |
| 2009/0114589 | A1 | 5/2009 | Reiland et al. |

FOREIGN PATENT DOCUMENTS

| | | | |
|---|---|---|---|
| JP | 59-501738 | 10/1984 | |
| JP | 3679222 B2 * | 8/2005 | ............ B01D 29/21 |
| JP | 2007-501103 | 1/2007 | |
| JP | 2008-540914 | 11/2008 | |
| KR | 10-0432955 B1 | 9/2004 | |
| WO | WO 2006/120242 | 11/2006 | |
| WO | WO 2007/140247 A2 | 12/2007 | |

* cited by examiner

VENTED LIQUID FILTER VENTED THROUGH MEDIA

CROSS-REFERENCE TO RELATED PATENT APPLICATIONS

This patent application claims the benefit of U.S. Provisional Patent Application No. 61/428,337, filed Dec. 30, 2010, the entire teachings and disclosure of which are incorporated herein by reference thereto.

FIELD OF THE INVENTION

The present invention generally relates to fluid filters and assemblies, and more particularly to liquid filters and assemblies.

BACKGROUND OF THE INVENTION

Many liquid systems, such as fuel systems for engines, utilize replaceable filters for filtering particulate out of the liquid system. Once the filter becomes spent, i.e. its serviceable life has been used, the filter is replaced by removing the old filter and replacing it with a new filter.

In many systems, such as fuel systems, it is beneficial to avoid entraining air into the liquid system to avoid a reduction in performance of the downstream engine. However, during replacement of the filters, the filters are typically empty and filled with air. Once the system is started, as fuel is pumped into the filter, this air can be forced through the rest of the system affecting the downstream components.

As such, steps to evacuate this air have been tried. For instance, in U.S. Pat. No. 7,147,110 to Clausen et al. includes a vent orifice in an end cap of the replaceable filter element which allows air that is trapped within the filter to be evacuated through the filter element and vented back to the fuel tank. Unfortunately, the vent orifice of Clausen is directly exposed to the dirty fuel side of the filter and can be easily clogged preventing the evacuation of air through the vent orifice.

The present invention relates to improved systems for facilitating venting air from a filter, such as at maintenance intervals.

BRIEF SUMMARY OF THE INVENTION

A filter apparatus and filter element therefore are provided. The filter apparatus and filter element are configured to improve venting of air from the filter apparatus during maintenance intervals or when the system runs empty of fluid.

The filter apparatus includes a filter head including an inlet port, a main flow outlet port and a drain flow outlet port. The filter element includes a ring of filter media defining an internal cavity. The filter element defines a main flow passage and a drain flow passage through the internal cavity. Each flow passage has an inlet on a clean side of the filter media directly fluidly communicating with the internal cavity. The main flow passage is fluidly coupled to the main flow outlet port. The drain flow passage is fluidly coupled to the drain flow outlet port. The filter media separates the inlet port from the main flow and drain flow outlet ports.

In one embodiment, the filter head further includes a standpipe including an inner cylindrical tube defining the main flow outlet port and an outer cylindrical tube surrounding the inner cylindrical tube. The inner and outer cylindrical tubes define the drain flow outlet port therebetween. The filter element further includes a first seal member sealing with the outer cylindrical tube and a second seal member sealing with the inner cylindrical tube.

In one embodiment, the second seal member seals with the inner cylindrical tube such that it separates the main flow passage from the drain flow passage.

In one embodiment, the second seal member has a smaller inner diameter than the first seal member.

In one embodiment, both the inner and outer cylindrical tubes extend through the first seal member and only the inner cylindrical tube extends through the second seal member.

In one embodiment, the drain flow passage includes a restriction sized to permit gas flow but that is sized to substantially prohibit liquid flow.

In one embodiment, the first seal member seals the main flow outlet port to the main flow passage, the first and second seal members seal the drain flow passage outlet to the drain flow outlet port, and the second seal portion prevents fluid from circumventing the filter media.

In one embodiment, no fluid exiting the filter head via either the drain flow outlet port or the main flow outlet port circumvents the filter media.

In one embodiment, the filter element further includes a check valve limiting fluid flow through the drain flow passage in a direction extending from the inlet thereof to the drain flow outlet port.

In a particular embodiment of the filter element, the filter element includes a ring of filter media defining an internal cavity. The filter element further includes a main flow passage and a drain flow passage through the internal cavity. Each flow passage has an inlet on a clean side of the filter media directly fluidly communicating with the internal cavity. The filter element also includes a first seal portion defining an outlet from the internal cavity and a second seal portion separating the main flow passage from the drain flow passage.

In one embodiment, the second seal portion defines a main flow passage outlet for the main flow passage; and the first and second seal portions define a drain flow passage outlet therebetween.

In one embodiment, the second seal portion is downstream of both the main flow outlet and drain flow outlet.

In one embodiment, the first seal portion has an inner diameter that is smaller than an inner diameter of the second seal portion.

In one embodiment, the first and second seals are formed from separate discrete seal members that are axially spaced apart.

In one embodiment, the drain flow passage includes a restriction between the drain flow passage inlet and drain flow outlet. In one embodiment, the restriction is sized large enough to allow sufficient air flow while small enough to prevent significant liquid flow.

In one embodiment, the filter element is configured such that fluid passing through both of the main flow passage and drain flow passage does not circumvent passing through the ring of filter media.

In one embodiment, the filter element further includes a central support. The central support defines, at least in part, the main flow passage and the drain flow passage. The central support is positioned, at least in part, within the internal cavity.

In one embodiment, the second seal is carried by the central support. The filter element further includes a first end cap secured to a first end of the filter media. The first end cap carrying the first seal.

In one embodiment, the filter element further includes a second end cap. The second end cap is secured to a second end of the filter media. The second end is opposite the first end. The second end cap being imperforate.

In one embodiment, the second seal is axially positioned between a first abutment portion of the central support and a retaining member affixed to the central support.

In one embodiment, the first seal is axially positioned between a second abutment portion of the central support and a first end cap secured to an end of the filter media.

In one embodiment, the filter element further includes a check valve arrangement in line with the drain flow passage limiting fluid flow through the drain flow passage in a single direction. In a more particular embodiment, the filter element includes a central support within at least a portion of the internal cavity. The central support defines, at least in part, the drain flow passage. The check valve arrangement includes a floating valve member positioned adjacent an outlet end portion of the drain flow passage.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
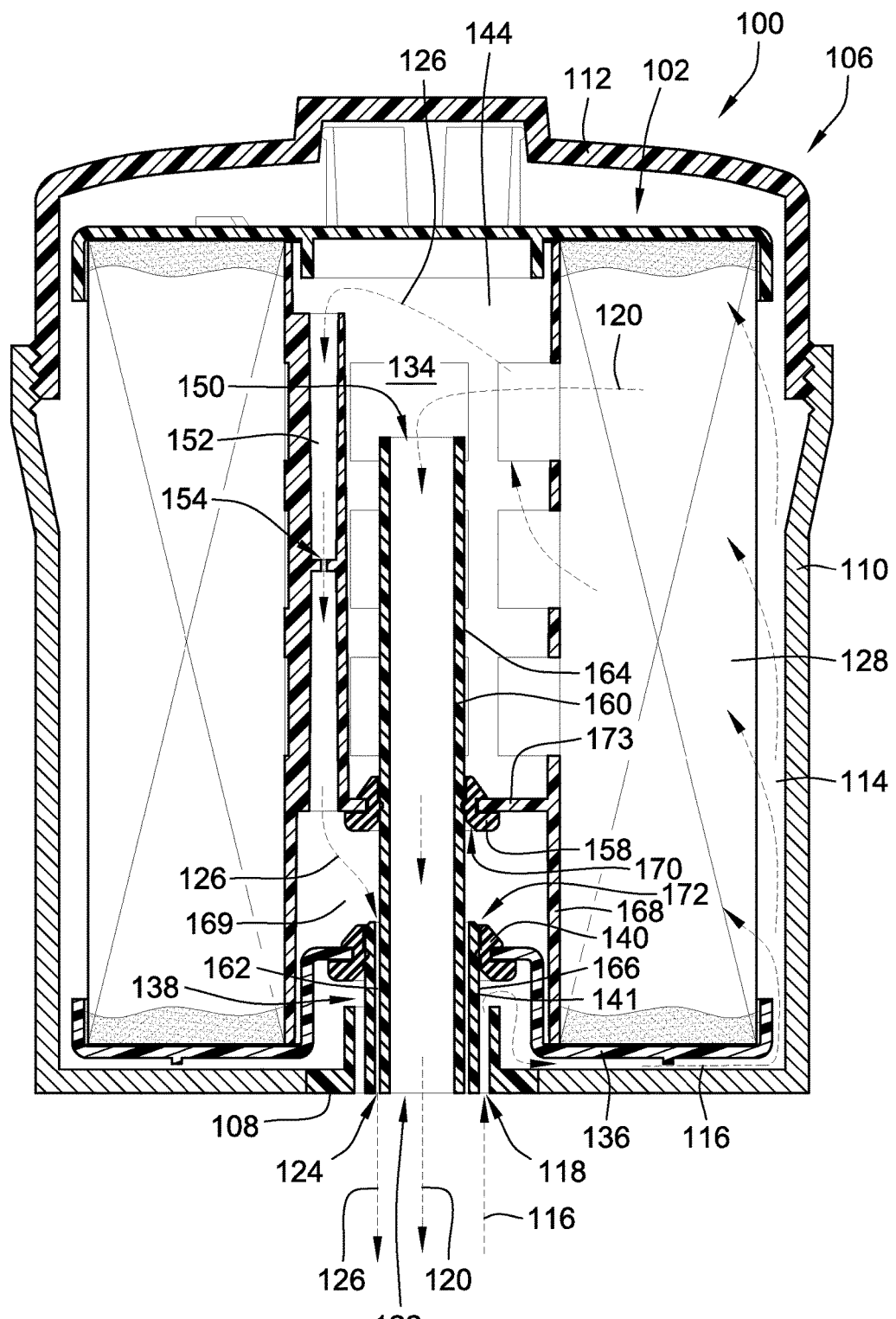
FIG. 1 is a simplified cross-sectional illustration of a filter apparatus according to an embodiment of the present invention.

FIG. 1 illustrates an embodiment of a filter assembly 100 according to the teachings of the present invention. The filter assembly 100 generally includes a replaceable filter element 102 that is removably mounted to a filter head. The filter head is illustrated in simplified form as a housing 106 and a stand pipe 108.

The housing 106 includes a shell 110 and removable lid 112. The removable lid 112 and shell 110 define an interior cavity 114 in which the filter element 102 is housed. The removable lid 112 is threadedly secured to shell 110 to provide selective access to interior cavity 114 to allow for replacement of filter element 102.

In the schematic illustration, dirty fuel, illustrated as arrow 116, enters filter assembly 100 through inlet 118 in standpipe 108. In other embodiments, the dirty fuel inlet 118 could be formed from other components and need not pass through stand pipe 108. Clean fuel, illustrated as arrow 120, exits the filter assembly 100 through clean fuel outlet 122 formed in standpipe 108. The filter assembly 100 also includes a drain outlet 124 that allows air 126 trapped in the filter assembly 100, such as at maintenance intervals or if the system were to be run empty of fuel, to be evacuated from the filter assembly 100. Typically, the drain outlet 124 is operably fluidly coupled to the fuel tank such that this air 126 will be evacuated back to the fuel tank. However, it could be evacuated to other locations as appropriate.

Figure 2:
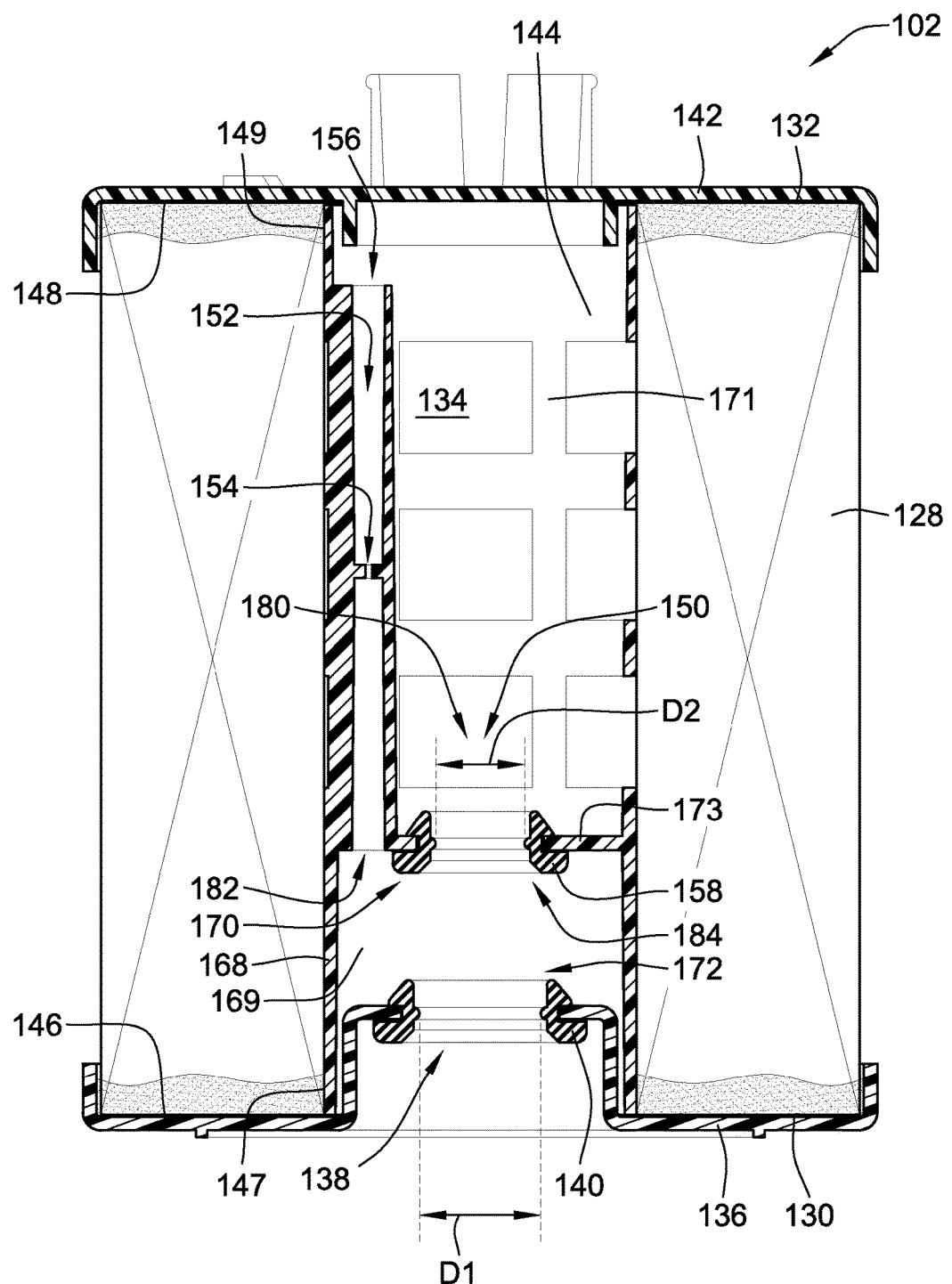
FIG. 2 is a cross-sectional illustration of the filter element of FIG. 1.

With additional reference to FIG. 2, the filter element 102 is illustrated removed from housing 106. The filter element 102 generally includes a ring of filter media 128 extending axially between first and second opposed ends 130, 132. The ring of filter media 128 generally bounds, at least in part, an internal cavity 134. In this embodiment, the internal cavity 134 is a clean fuel side of the filter element 102 because fuel flows radially inward through the ring of filter media 128 as it is filtered.

An open end cap 136 is affixed to first end 130 of the filter media 128. The end cap 136 includes an outlet opening 138. The outlet opening 138 carries a seal member 140. In this embodiment, seal member 140 radially seals on a radially outer surface of a radially outer portion 141 of standpipe 108 and prevents dirty fuel 116 from bypassing the filter element 102. The seal member 140 provides an exit path from the internal cavity 134. As will be more fully developed below, both the clean fuel 120 and the air 126 exit the filter element 102 by passing through, seal member 140 such that two separate flow paths pass through the seal member 140 are generated.

The filter element 102 is closed at the opposite end. The filter element 102 includes a closed end cap 142 affixed to second end 132 of the filter media 128 to close that end 132 of the filter element 102.

The end caps 136, 142 can be sealingly attached to the ends 130, 132 of the filter media in any known way, such as using plastisol, urethane, embedding the media into the end caps 136, 142, foaming or molding the end caps 136, 142 to the filter media 128, etc.

A center tube 144 is carried within internal cavity 134 of the filter media 128. The center tube 144 provides radial support for the ring of filter media 128. The center tube 144 is perforated and permits clean fuel 120 to pass radially therethrough. The center tube 144 extends axially between an inner surface 146 of open end cap 136 and an inner surface 148 of closed end cap 142. In this embodiment, the ends 147, 149 of the center tube 144 are sealed to the corresponding end caps 136, 142 to avoid fluid by pass.

To provide the venting features, the filter element 102 defines a pair of flow passages through internal cavity 134.

A first flow passage is clean fuel flow passage 150 that allows clean fuel 120 that has passed through the ring of filter media 128 to flow toward downstream components of the fuel system, when the filter element 102 is mounted to stand pipe 108.

A second flow passage is air bleed passage 152 that, when the filter element 102 is mounted to stand pipe 108, allows air trapped within the filter assembly 100 to be evacuated to drain outlet 124, and ultimately back to tank. The clean fuel flow passage 150 and air bleed passage 152 extend through the internal cavity 134 of the filter element 102 in a generally parallel manner.

The air bleed passage 152 includes a restriction 154 that is generally sized to oppose or limit fluid flow by fuel but sized to generally allow fluid flow by air. As such, air that is evacuated from the filter assembly 100 after maintenance intervals can be evacuated through air bleed passage 152, without the air otherwise being trapped within the rest of the fuel system. However, large quantities of filtered fuel will not escape back to tank after being filtered through the air bleed passage 152.

The air bleed passage 152 includes an inlet 156 that is housed entirely within the internal cavity 134 of the filter element 102. When the filter element 102 is mounted to the stand pipe 108, the only way for air to pass through air bleed passage 152 is for the air to first pass through the filter media 128. This arrangement provides a significant benefit over prior designs in that the inlet 156 of the air bleed passage 152 is only exposed to the clean side of the filter element 102. This arrangement prevents dirty fuel and potential contaminants carried thereby from plugging the restriction 154.

Center tube 144 carries a second seal member 158. The second seal member 158 separates the clean fuel flow passage 150 from the air bleed passage 152. The second seal member 158 generally defines the clean fuel flow passage 150. The second seal member 158 radially seals with a clean fuel portion 160 of stand pipe 108. The clean fuel portion 160 of stand pipe 108 is fluidly coupled to clean fuel outlet 122. As such, clean fuel 120 that enters internal cavity 134 of filter element 102 by passing through media 128, flows through the clean fuel flow passage 150 by flowing through clean fuel portion 160 of stand pipe 108 to clean fuel outlet 122 and then to downstream components of the fuel system.

With reference to FIG. 1, the radially outer portion 141 of stand pipe 108 and the clean fuel portion 160 of the stand pipe 108 define an air bleed channel 162 therebetween, which is fluidly connected to air bleed passage 152 when filter element 102 is mounted to stand pipe 108.

With the filter element 102 mounted to stand pipe 108, the second seal member 158 seals on radially outer surface 164 of clean fuel portion 160 and the first seal member 140 seals on a radially outer surface 166 of radially outer portion 141 of stand pipe 108. This sealed relationship allows the air bleed passage 152 to be coupled to air bleed channel 162 of the stand pipe 108 via a passage formed between the clean fuel portion 160 of stand pipe 108 and an imperforate portion 168 of center tube 144.

The air bleed passage 152 of the center tube 144 exits axially between the first and second seal members 140, 158 at the imperforate portion 168 of center tube 144. When the filter element 102 is mounted to the stand pipe 108, the air bleed passage 152 exits on a downstream side 170 of second seal member 158 and a clean fuel side 172 of first seal member 140.

The second seal member 158 is carried by a radially inward projecting flange 173 of center tube 144. The second seal member 158 fluidly communicates the imperforate portion 168 of center tube 144 with a perforated portion 171 of center tube 144 when the filter element 102 is not mounted to the stand pipe 108. Similarly, the air bleed passage 152 fluidly communicates the perforated portion 171 of center tube with the imperforate portion 168. This communication, however, occurs whether or not the filter element 102 is mounted to the stand pipe 108.

The first seal member 140 has a diameter D1 that is greater than the diameter D2 of the second seal member 158. This relationship permits both the radially inner clean fuel portion 160 of the stand pipe 108 as well as the radially outer portion 141 of stand pipe 108 to pass through first seal member 140. Preferably, the first and second seal members 140, 158 are concentric, but axially offset.

Figure 3:
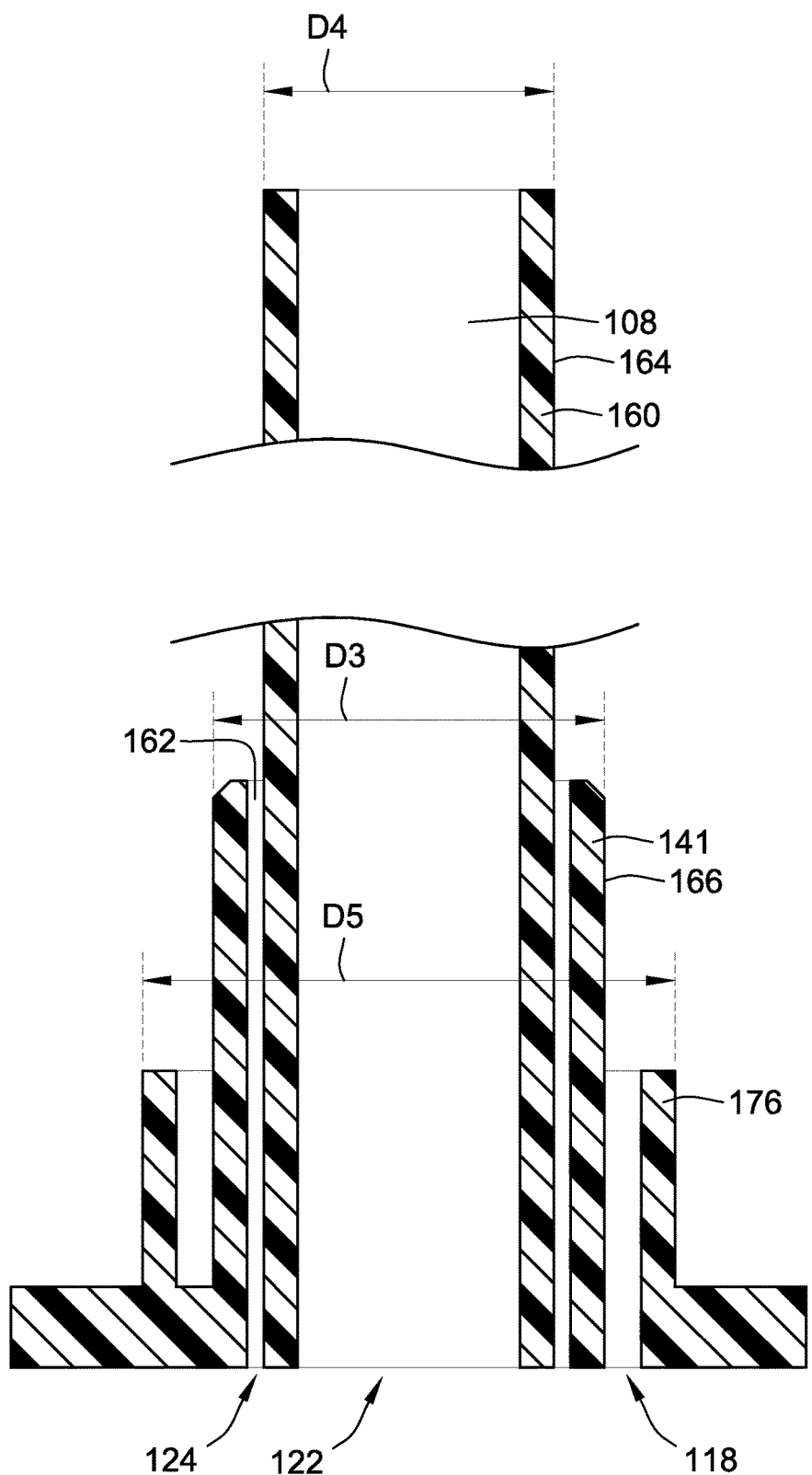
FIG. 3 is a simplified cross-sectional illustration of the standpipe of FIG. 1.

With reference to FIG. 3, the outer surface 166 of radially outer portion 141 of stand pipe 108 has a diameter D3 that is greater than the diameter D4 of outer surface 164 of the inner clean fuel portion 160 of stand pipe 108. Diameters D3 and D4 are sized to provide a good sealing fit with seal members 140, 158 while allowing the filter element 102 to be mounted onto stand pipe 108. In other embodiments, these radial seals could be provided by axial seals.

The stand pipe 108 includes a third cylindrical portion 176 that has a diameter D5 which is greater than both diameter D3 and D4.

Other arrangements could be provided that eliminate one or more of the cylindrical portions of the stand pipe 108 (i.e. clean fuel portion 160, radially outer portion 141 and third cylindrical portion 176).

With reference to FIG. 2, the first seal member 140 is axially spaced further away from second end 132 than second seal member 158.

The first and second seal members 140, 158 are preferably recessed axially into the internal cavity 134 defined by the ring of filter media 128 such that the seal members 140, 158 are circumferentially surrounded by filter media 128 and axially positioned between first and second ends 130, 132 of the filter media 128.

The air bleed passage 152 and clean fuel flow passage 150 both have inlets 156, 180, respectively, that are on a clean fuel side of the filter media 128. In this embodiment, both inlets 156, 180 are downstream from a perforate portion of the center tube 144.

Further, when not mounted to a filter head, these passages 150, 152 have outlets 182, 184 that fluidly communicate with one another via a chamber 169 bounded by the imperforate portion 168 of center tube 144. Chamber 169 is generally axially bounded by flange 173 and open end cap 136. The imperforate portion 168 of center tube 144 circumferentially bounds the chamber 169. Because end 147 of the center tube 144 is operably sealed to open end cap 136, the only way for fluid to enter or exit this chamber 169 is via the air bleed passage 152, first seal member 140 or second seal member 158.

In operation, filter element 102 is mounted within housing 106. Lid 112 can be threadedly removed from shell 110 to provide access to central cavity 114. If a spent filter element is already stored within filter housing 106, this filter element can be removed and discarded. A new clean filter element 102 is then inserted into cavity 114.

As the clean filter element 102 is inserted into shell 110, the filter element 102 is axially mounted over stand pipe 108. At least a portion of stand pipe 108 will generally pass through both the first and second seal members 140, 158.

Once the filter element 102 is mounted on stand pipe 108, the lid 112 is threadedly secured to shell 112.

With the filter element 102 mounted over stand pipe 108, the radially outer portion 141 will pass through and form a seal with first seal member 140. This seal prevents dirty fuel from bypassing the filter media 128 and passing through clean fuel portion 160 of the stand pipe 108 to downstream components of the system or through air bleed channel 162 and, for example, returning back to the tank.

The clean fuel portion 160 axially passes through both the first and second seal members 140, 158 and forms a seal with second seal member 158. This sealing arrangement prevents clean fuel from passing through drain outlet 124.

With primary reference to FIG. 1, during initial startup, dirty fuel 116 is pumped into cavity 114. If air is housed within the cavity 114, it is pumped through media 128 and through air bleed passage 152. The air is passed through cavity 169 and exits the filter element 102 through the opening 138 that is bounded by first seal member 140 via air bleed channel 162 in stand pipe 108. This air is typically then passed back to the tank. Typically, the passage back to tank will be at a lower pressure than through the clean fuel portion 160.

Once internal cavity 114 fills with fuel, the clean fuel 120 will generally close air bleed passage 152. Additionally, the clean fuel 120 that has passed through filter media 128 will exit internal cavity 134 of the filter element 102 via clean fuel portion 160 of stand pipe 108 and pass through both the second seal member 158 and first seal member 140.

This operation illustrates that there are two parallel flow paths, one for the entrapped air to be bled from the filter assembly 100, and one for clean fuel to be passed on to downstream components, within internal cavity 134 of the filter element 102. When the filter element 102 is mounted to the stand pipe 108, both flow paths ultimately pass through the first seal member 140. However, as they pass through the first seal member 140, they remain separated as they pass through separate portions of stand pipe 108. Further, these flow paths are separated from one another as they pass through fluidly separated portions of the center tube 144.

Figure 6:
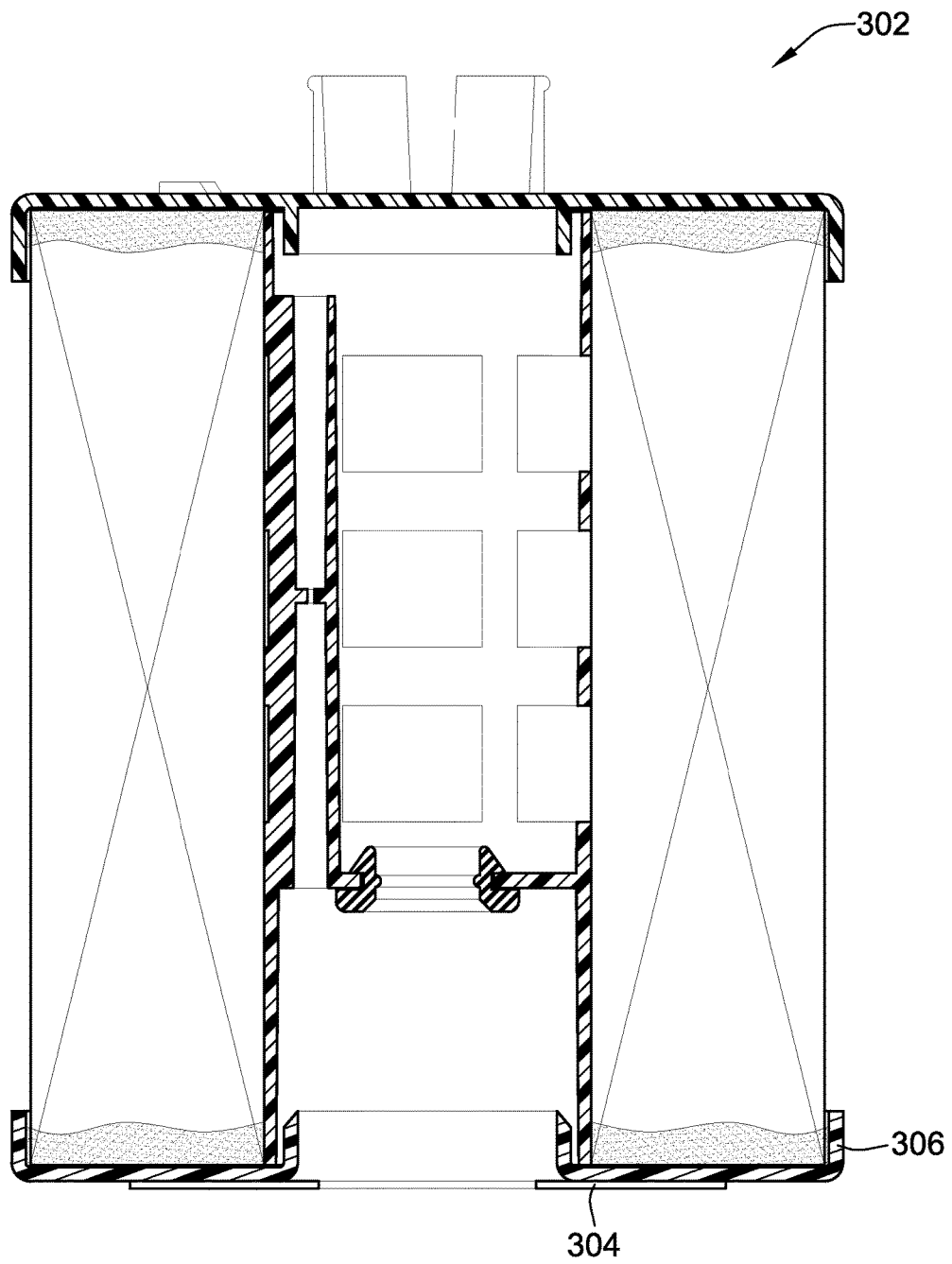
FIG. 6 is a further embodiment of a filter element according to an embodiment of the present invention.

FIG. 6 illustrates a further embodiment of a filter element 302. This embodiment is substantially similar to the prior embodiment in FIGS. 1-3. However, in this embodiment, the filter element 302 includes a different seal. Rather than including a seal member like first seal member 140, this embodiment includes seal member 304.

Here, the seal member 304 is a gasket affixed to end cap 306. Seal member 304 may be a felt gasket. However, other embodiments may use rubber or soft plastic to form seal member 304. In this embodiment, the seal member 304 forms the axial end of filter element 302, as opposed to being recessed into end cap 140 of the prior embodiment.

This seal member 304 can be used to form a radial seal such as illustrated in the prior embodiment. Alternatively, the seal member 304 could be used to form an axial seal depending on the stand pipe and filter head configuration.

Figure 4:
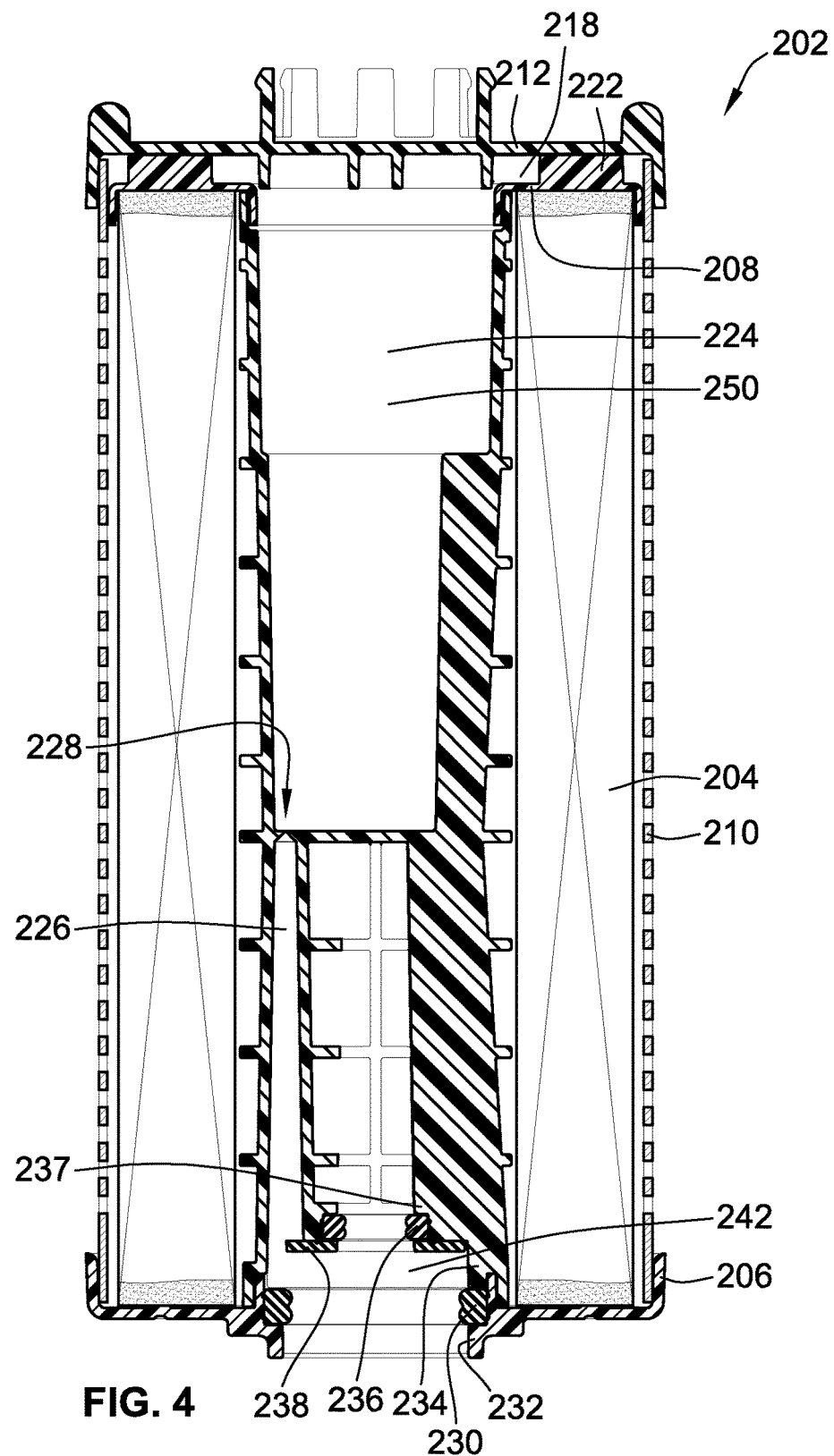
FIG. 4 is a cross-sectional illustration of a further embodiment of a filter element according to an embodiment of the invention.
Figure 5:
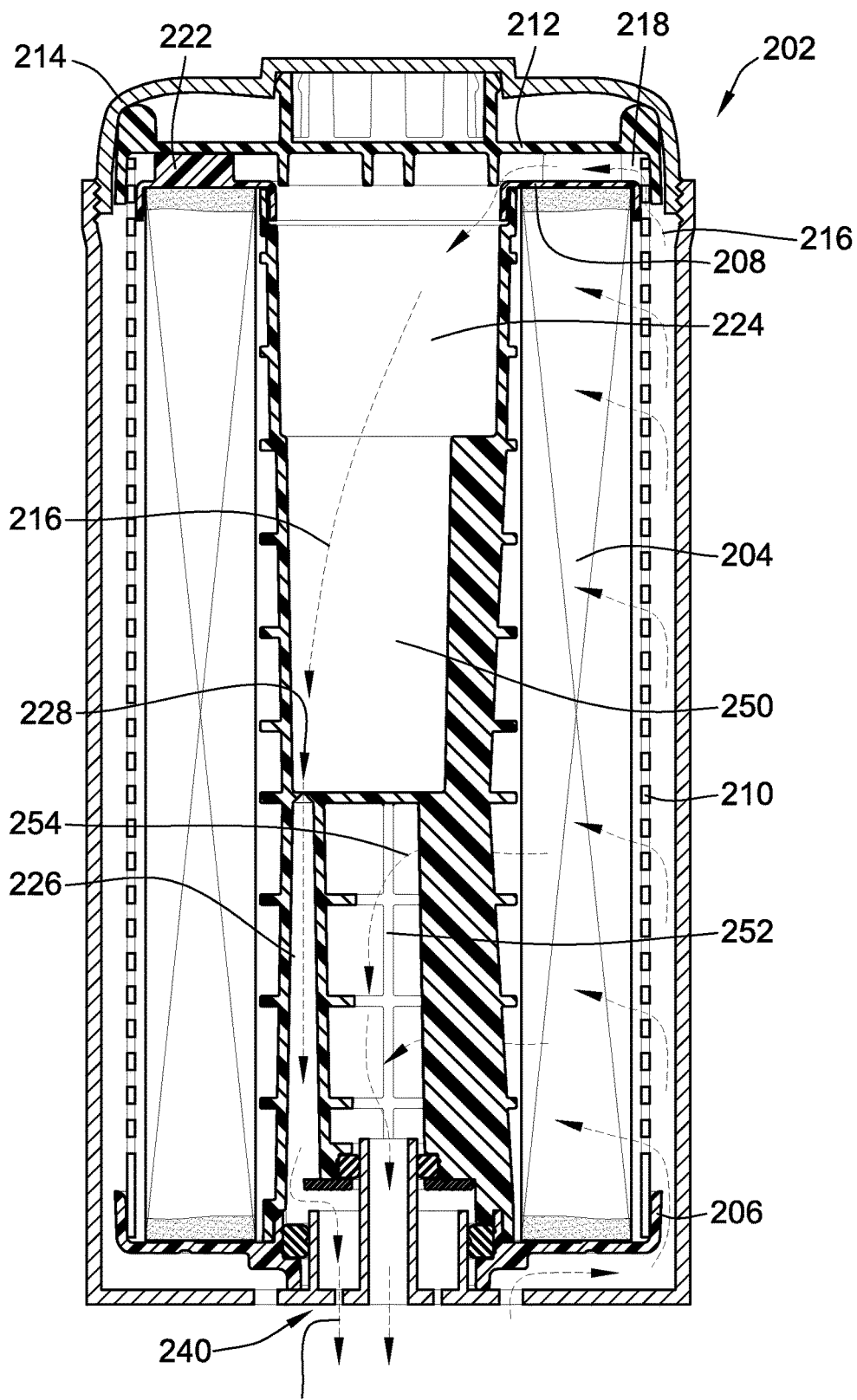
FIG. 5 is a cross-sectional illustration of the filter element o FIG. 4 installed into a filter housing.

FIGS. 4 and 5 illustrate a further embodiment of a filter element 202. Many features of this filter element 202 are similar to the features of filter element 102 discussed previously and thus, only the differences will be discussed below.

This filter element includes a ring of filter media 204 that extends axially between a first open end cap 206 and a second open end cap 208. The filter element 202 also includes an outer wrapper 210 that surrounds the ring of filter media 204.

An attachment member 212 is provided. The attachment member 212 is attached to end cap 208 and is used to attach the filter element 202 to a filter housing lid 214. Attachment member 212 may be releasably or permanently attached to end cap 208.

In this embodiment, air 216 will pass through a perforated wrapper 210 and then an air flow gap 218 formed between the attachment member 212 and second annular end cap 208. Either the second end cap 208 or the attachment member 212 may include axial standoffs 222 that space the end cap 208 from attachment member 212 to assist in maintaining air flow gap 218. Air 216 will then pass through center tube 224 into an air bleed passage 226. Again, air bleed passage 226 includes a restriction 228 sized to permit air passage but to inhibit or substantially prevent fuel flow.

The inlet of the air bleed passage 226 as well as the restriction 228 is downstream from wrapper 210 which assists in preventing larger contaminants from blocking restriction 228 and the wrapper 210 forms a pre-filter media for the filter element 202.

A first seal member 230 is carried between first end cap 206 and center tube 224. The first seal member 230 is axially positioned between a radially inward step 232 of end cap 206 and an axial abutment portion 234 of the center tube 224.

A second seal member 236 has a diameter that is smaller than first seal member 230. The second seal member 236 is axially positioned relative to a stepped portion 237 of center tube 224 that forms an axial abutment portion and a retaining element, in the form of washer 238 that is affixed to center tube 224. Washer 238 may be affixed to center tube 224 by snapping into a recess formed in the center tube 224, adhesively bonded to center tube 224, ultrasonically bonded/welded to center tube 224 or otherwise secured to center tube 224. With the washer 238 secured to the center tube 224, the washer 238 and stepped portion 237 form a channel that receives seal member 236 and that has a radially inward directed mouth that seal member 236 extends radially inward beyond for engagement with a stand pipe of a corresponding filter head.

The radially outward facing surface of seal member 236 has radially outward projecting ribs that facilitate improved sealing between the seal member 236 and center tube 224.

These seal members 230, 236 seal on stand pipe 240 much like the prior embodiment of FIGS. 1-3. These seal members 230, 236 in combination with an imperforate portion 242 of the stand pipe 224 operate much like chamber 169 of the prior embodiment.

In this embodiment, the air bleed passage 226 has its inlet upstream of the ring of filter media 204, however, it is located internal to the cavity defined by the filter media 204. This is because the center tube 224 includes imperforate portion 250 through which the air 216 passes after it passes through air flow gap 218. The center tube 224 also includes perforate portion 252 through which clean fuel 254 flows after the fuel has passed through filter media 204.

FIGS. 7-10 are cross-sectional illustrations of a further filter element 402 according to an embodiment of the present invention. The filter element 402 is similar to the embodiments of FIGS. 1 and 4.

Figure 7:
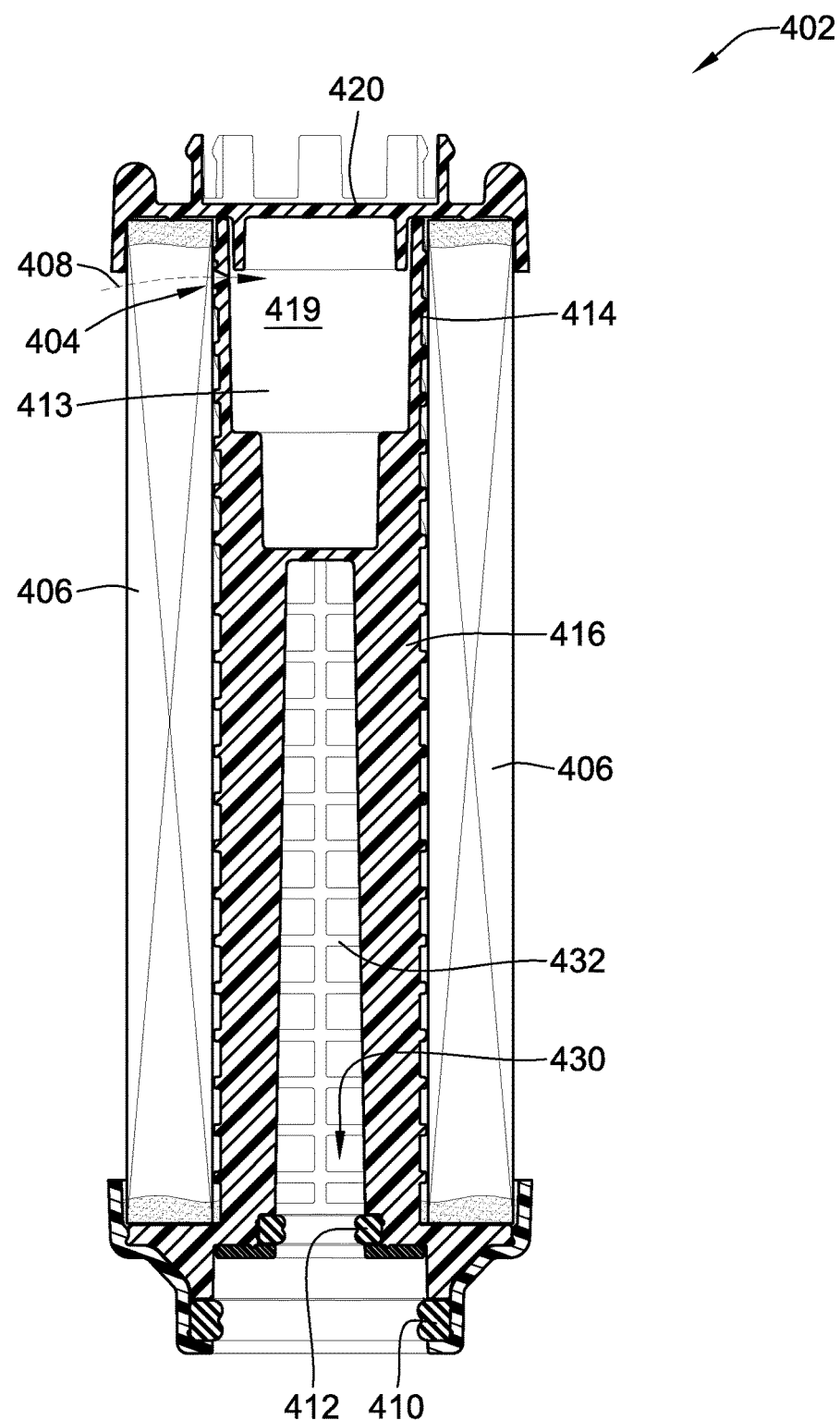
FIGS. 7-10 are cross-section illustrations of a further embodiment of a filter element according to an embodiment of the present invention.
Figure 8:
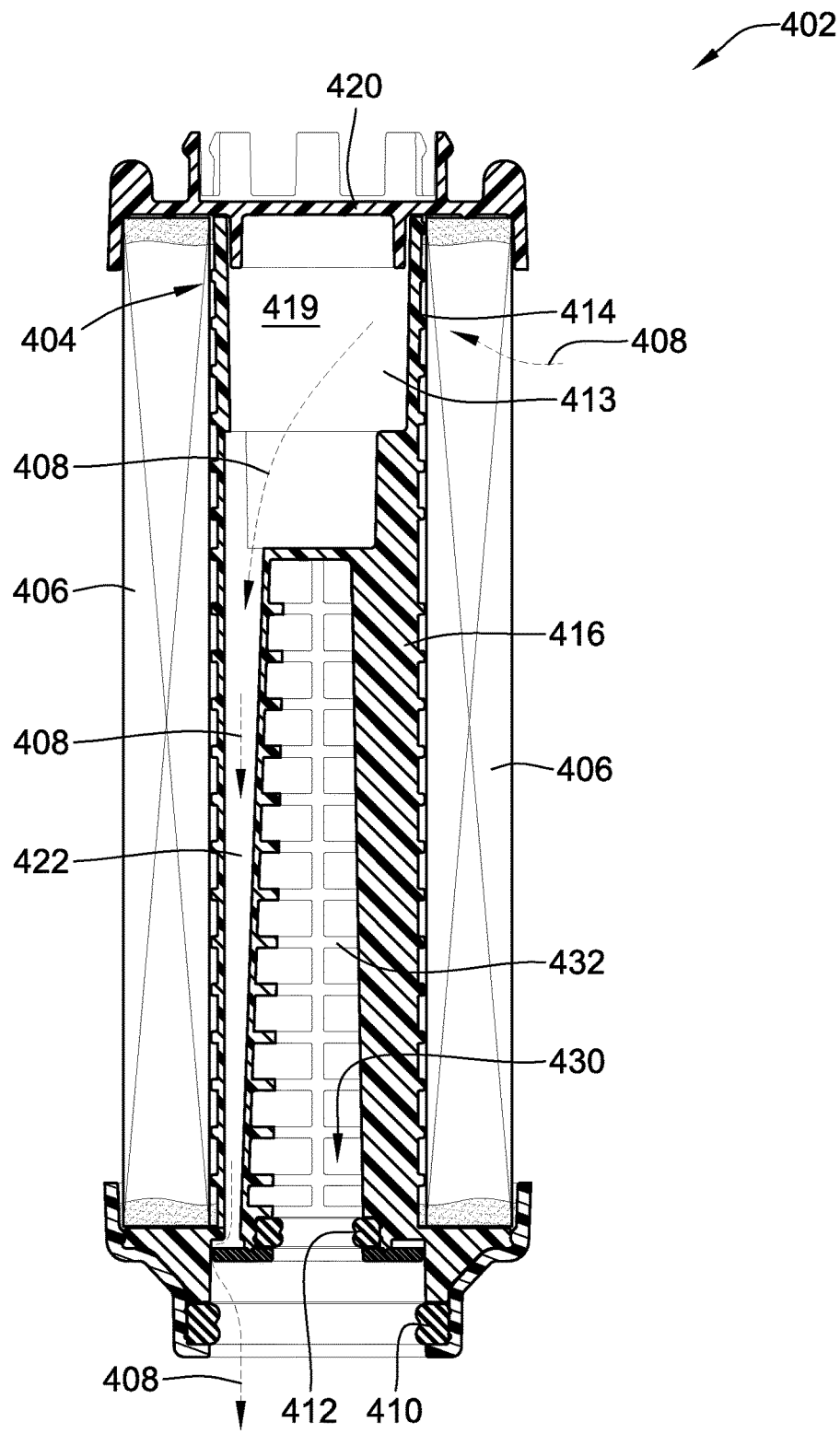
Figure 9:
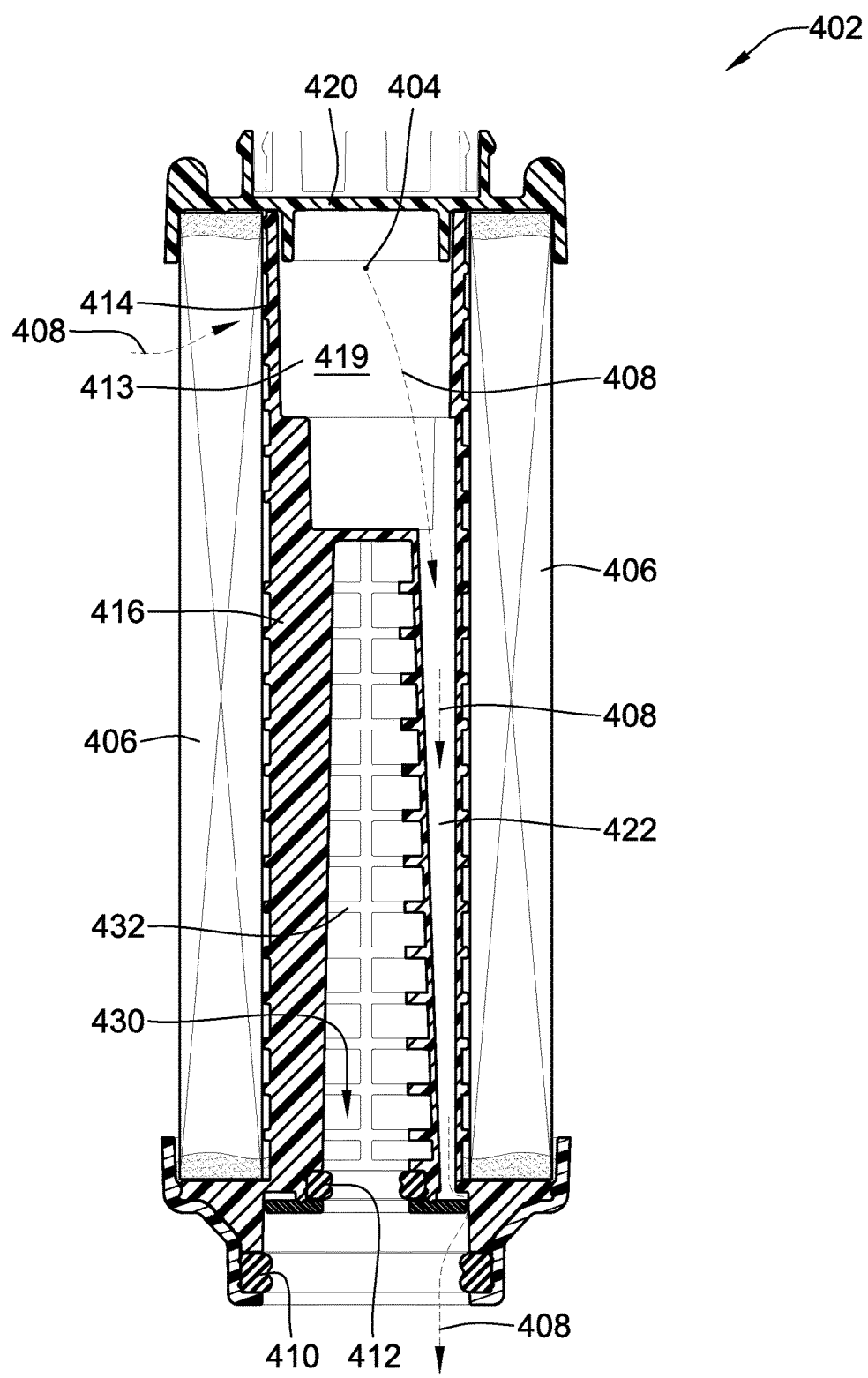
Figure 10:
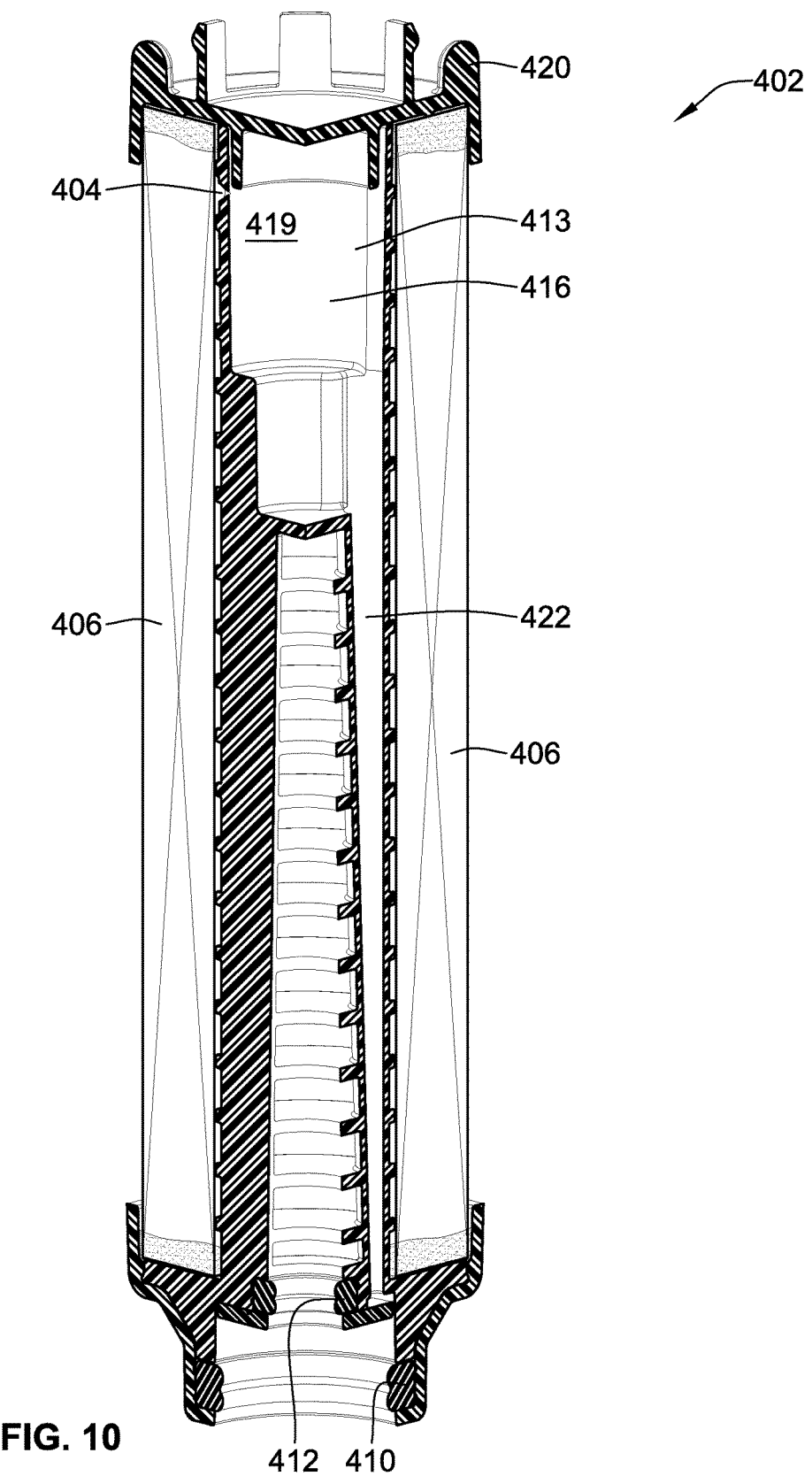

With reference to FIGS. 7 and 9, in this embodiment, the filter element 402 includes a restriction 404 that is downstream of filter media 406. As such, any air 408 that must be evacuated must pass through filter media 406. Further, the filter element 402 includes first and second seal members 410, 412 that are substantially similar to those of FIG. 4.

In this embodiment, the restriction 404 is formed in a generally imperforate portion 413 of a cylindrical sidewall portion 414 of the center tube 416. After air 408 passes through restriction 404, the air 408 enters an internal cavity 419 formed by end cap 420 and cylindrical sidewall portion 414 of the center tube 416. From there, the air 408 enters air bleed passage 422.

In this embodiment, the clean fluid passage 430 is defined by second seal member 412. Clean fuel will pass through perforate portion 432 of center tube 416 prior to passing through second seal member 412. Perforate portion 432 generally defines an inlet to the clean fluid passage of this embodiment As such, the inlet to both the clean fluid passage and the air bleed passage are on the interior and clean fluid side of the filter media.

Like prior embodiments, the clean fuel will typically flow through a portion of a stand pipe passing through the second seal member 412 as the clean fuel flows through the clean fuel flow passage 430.

Figure 11:
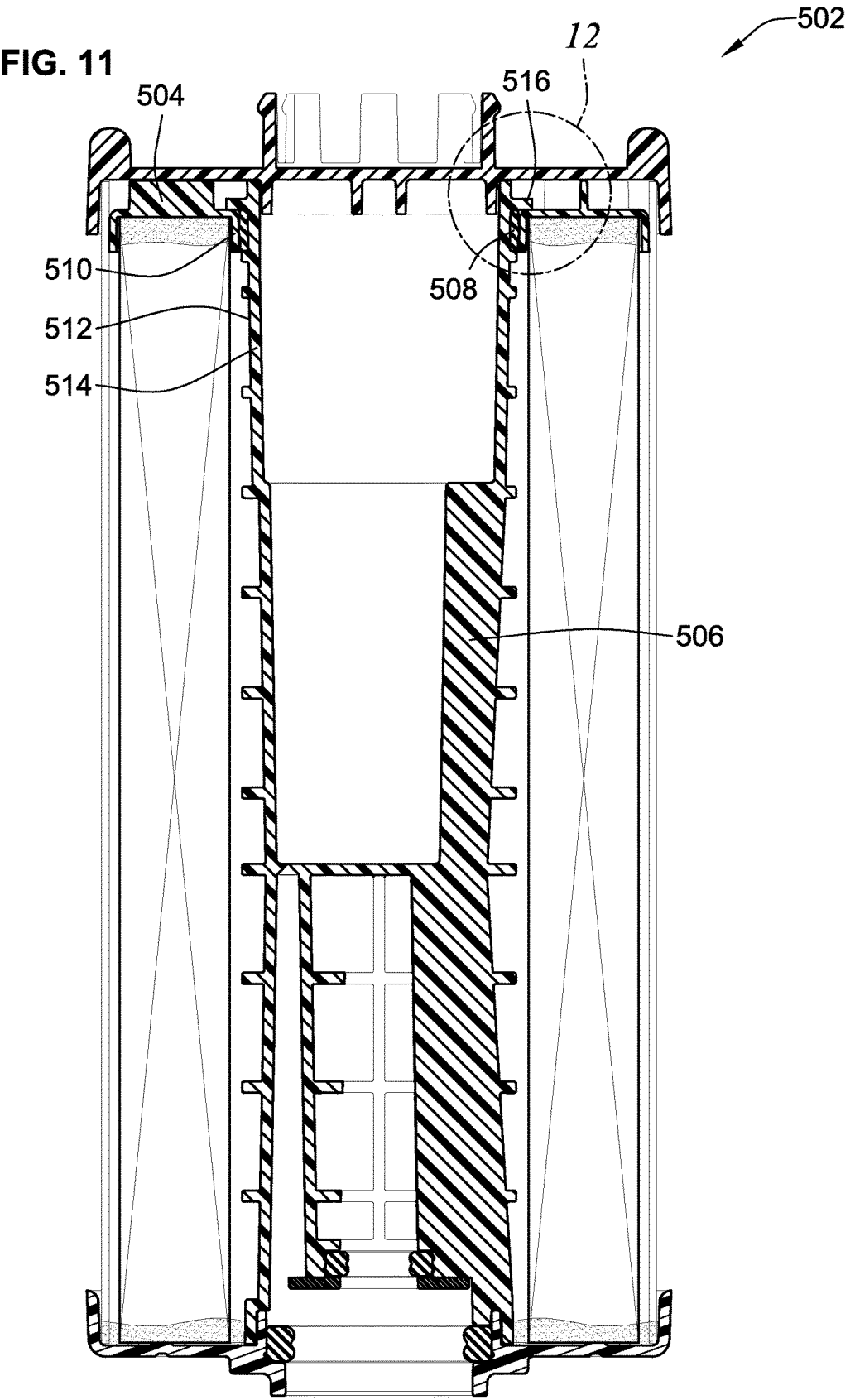
FIGS. 11 and 12 are cross-sectional illustrations of a further embodiment of a filter element according to the present invention.
Figure 12:
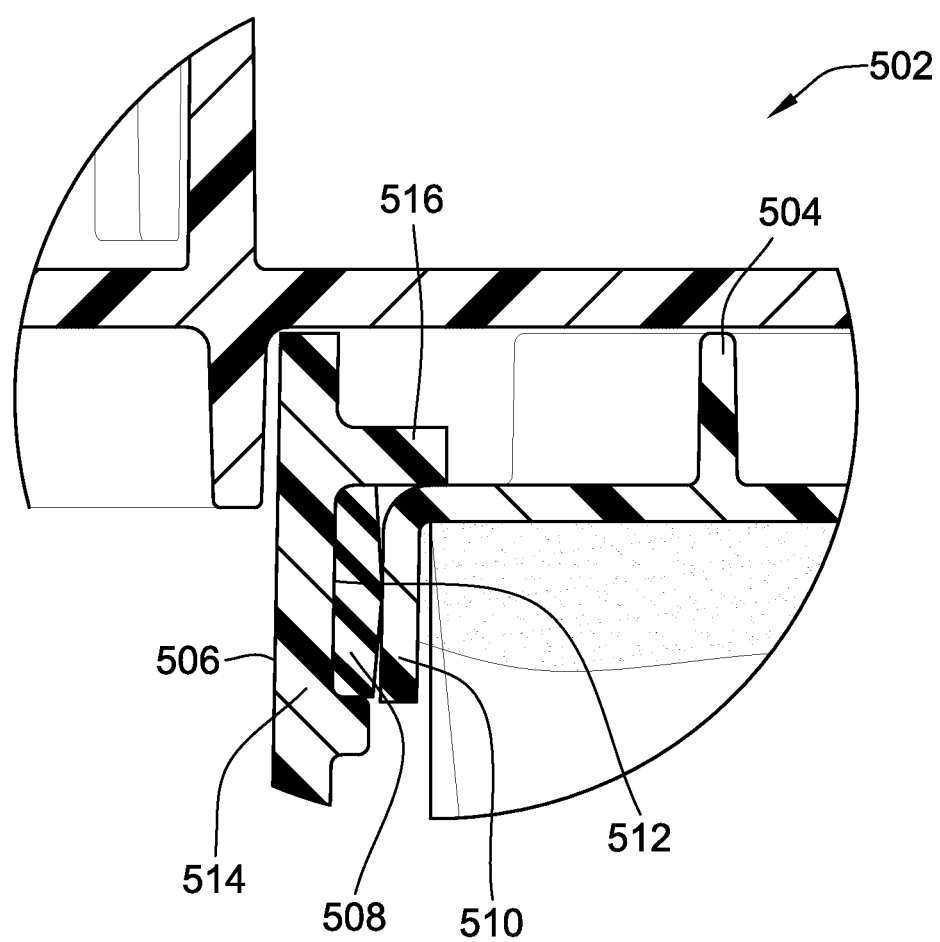

FIG. 11 illustrates a further embodiment of a filter element 502. This embodiment is substantially similar to the embodiment of FIGS. 4-5. However, as also illustrated in FIG. 12, this embodiment has a different arrangement between the upper end cap 504 and center tube 506.

This embodiment includes a seal element 508 positioned radially between an inner skirt 510 of the end cap 504 and an outer surface 512 of the cylindrical sidewall portion 514 of center tube 506.

Further, the center tube 506 includes a radially outward projecting flange 516 that extends radially over inner cylindrical skirt 510.

Figure 13:
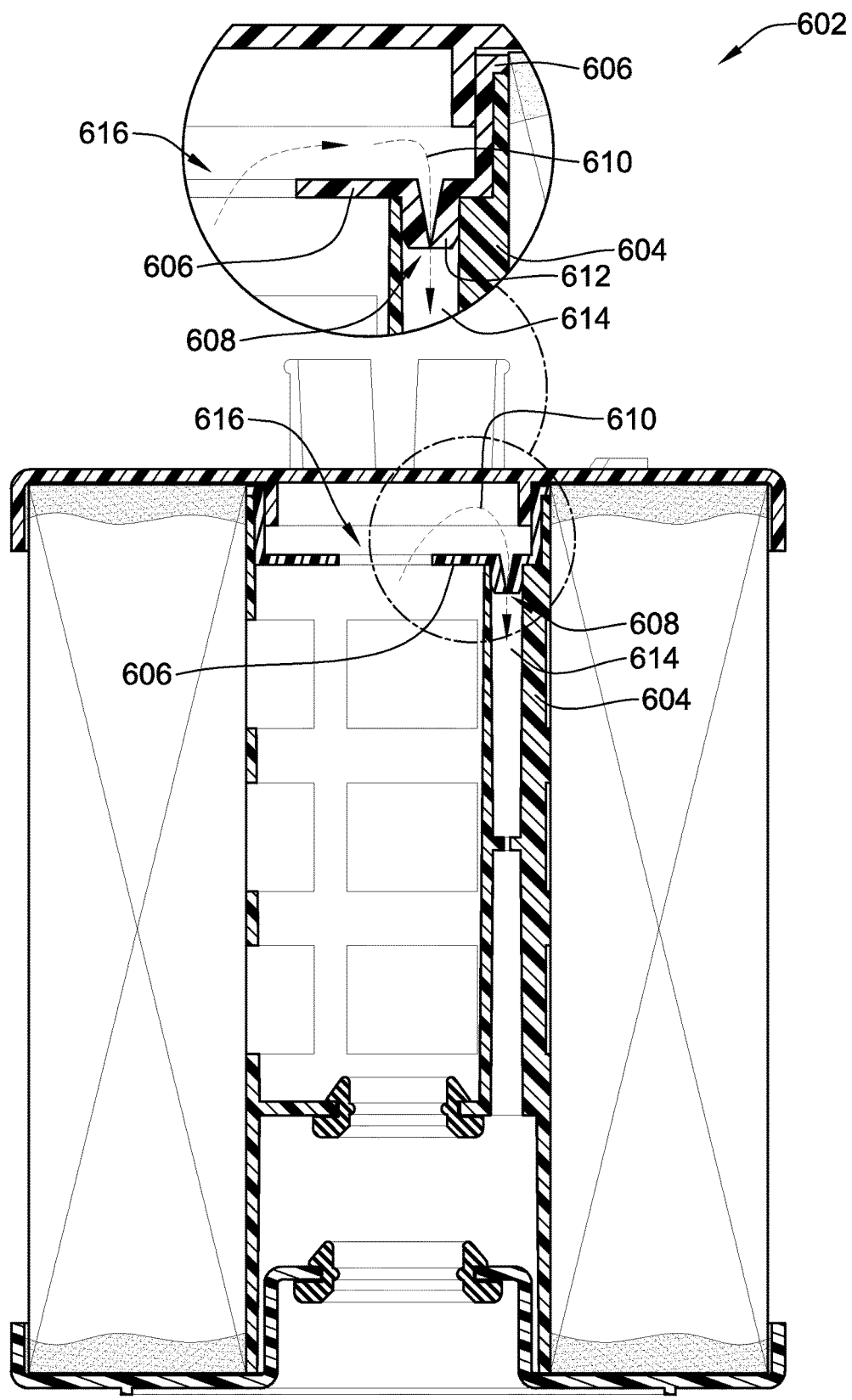
FIG. 13 is a cross-sectional illustration of a further embodiment of a filter element according to an embodiment of the present invention.

A further embodiment of a filter element 602 is illustrated in FIG. 13. This filter element 602 is substantially similar to the embodiment of FIGS. 1 and 6.

In this embodiment, the center tube 604 is not a one-piece construction. Instead, the center tube 604 includes a restriction plate 606.

The restriction plate 606 defines a restriction 608 that allows air flow 610 but inhibits fuel flow therethrough. The restriction 608 is formed in a generally cylindrical projection 612 that extending into passage 614 formed in center tube 604. The combination of restriction 608 and passage 614 forms an air bleed passage as discussed previously.

The restriction plate 606 includes an opening 616 that permits the air to flow through restriction 608 after it has passed through the filter media of the filter element 602.

Figures 14, 15:
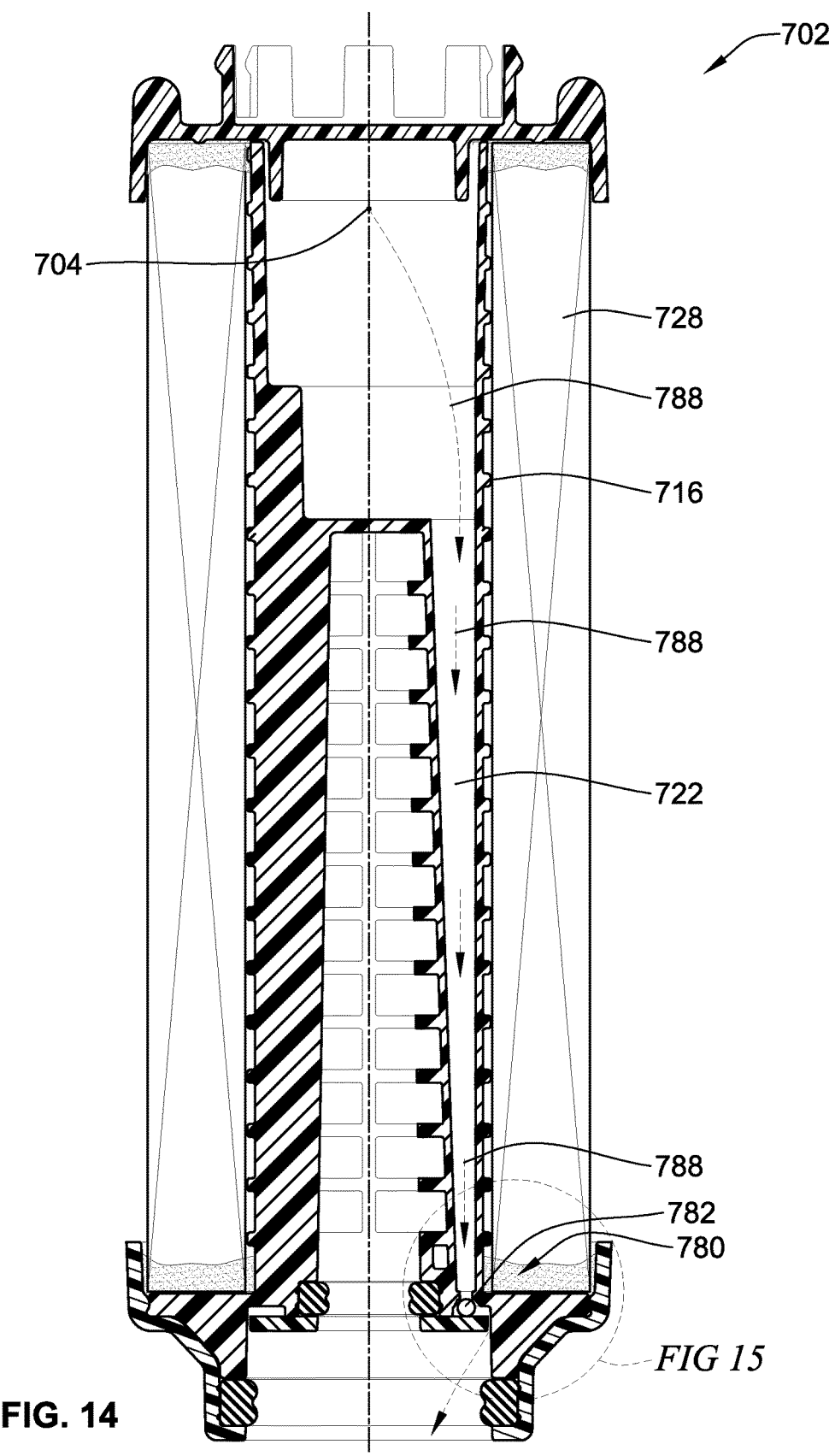
FIGS. 14-17 are cross-sectional illustrations of a further embodiment of a filter element according to an embodiment of the present invention.
Figure 15:
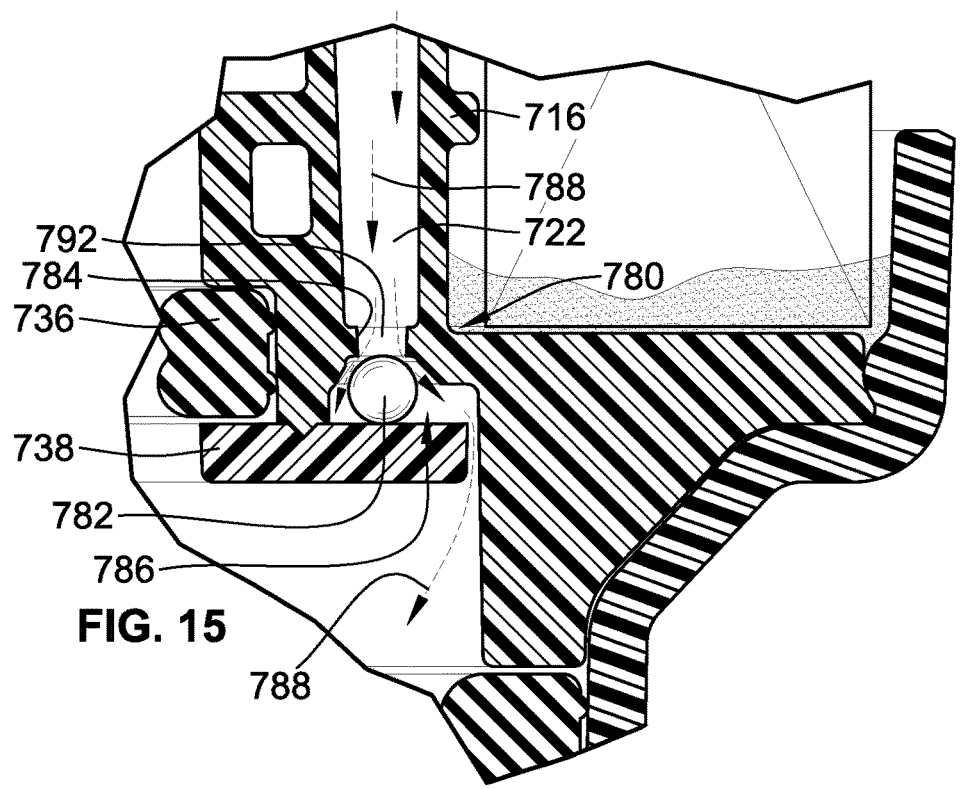

FIG. 14 illustrates a further embodiment of a filter element 702 useable in a filter assembly according to the teachings of the present invention. For instance, the filter element 702 could be used with a stand pipe similar to that of stand pipe 240 of prior embodiments. The filter element 702 includes a vent arrangement that is typically vented through the filter media 728 via restriction 704, much like prior filter element 402, described above.

This embodiment further includes a check valve arrangement 780 for preventing back flow of fluid into the filter element 702 through air bleed passage 722 defined by center tube 716. In the illustrated embodiment, the check valve arrangement 780 is provided by a valve member illustrated in the form of a floating ball 782 that cooperates with the center tube 716 and particularly outlet end portion 784 of the air bleed passage 722 defined by center tube 716.

The outlet end portion 784 defines a seat 786 with which the outer surface of floating ball 782 operably sealingly interacts to prevent back flow or to allow fluid flow depending on the pressure differential across the check valve arrangement 780. In FIGS. 14 and 15, air (illustrated by arrow 788) creates a higher pressure upstream of floating ball 782 and is flowing through the air bleed passage 722. As such, the floating ball 782 is axially spaced away from the seat 786 into an open state permitting the air 788 to flow through the check valve arrangement 780 and onto tank as discussed above.

Figure 16:
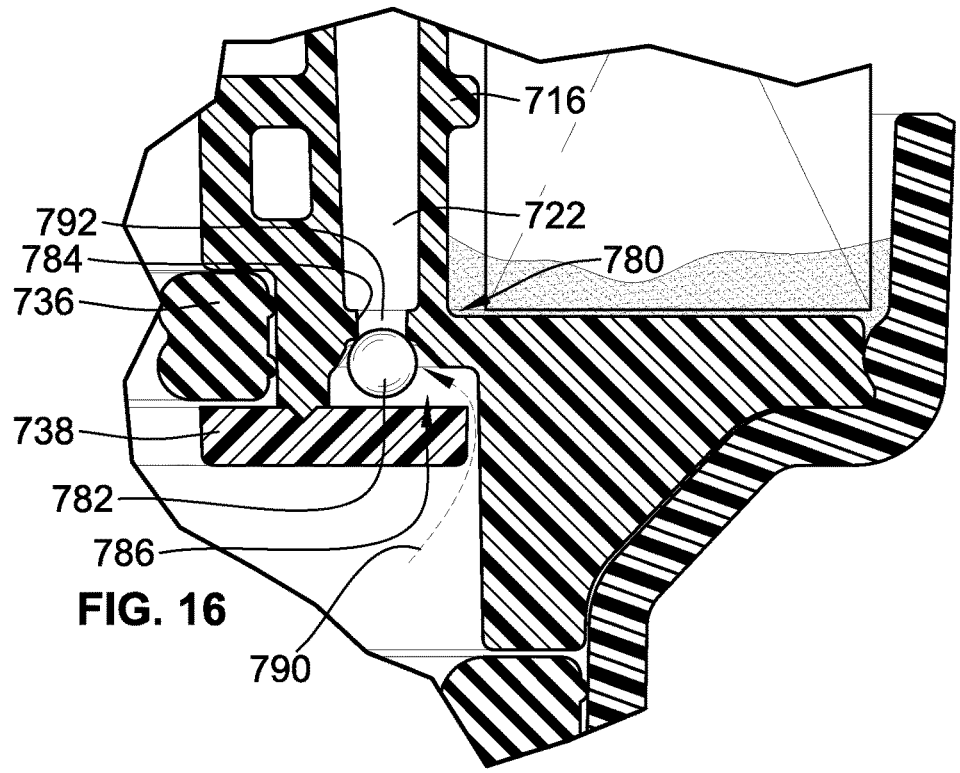
Figure 17:
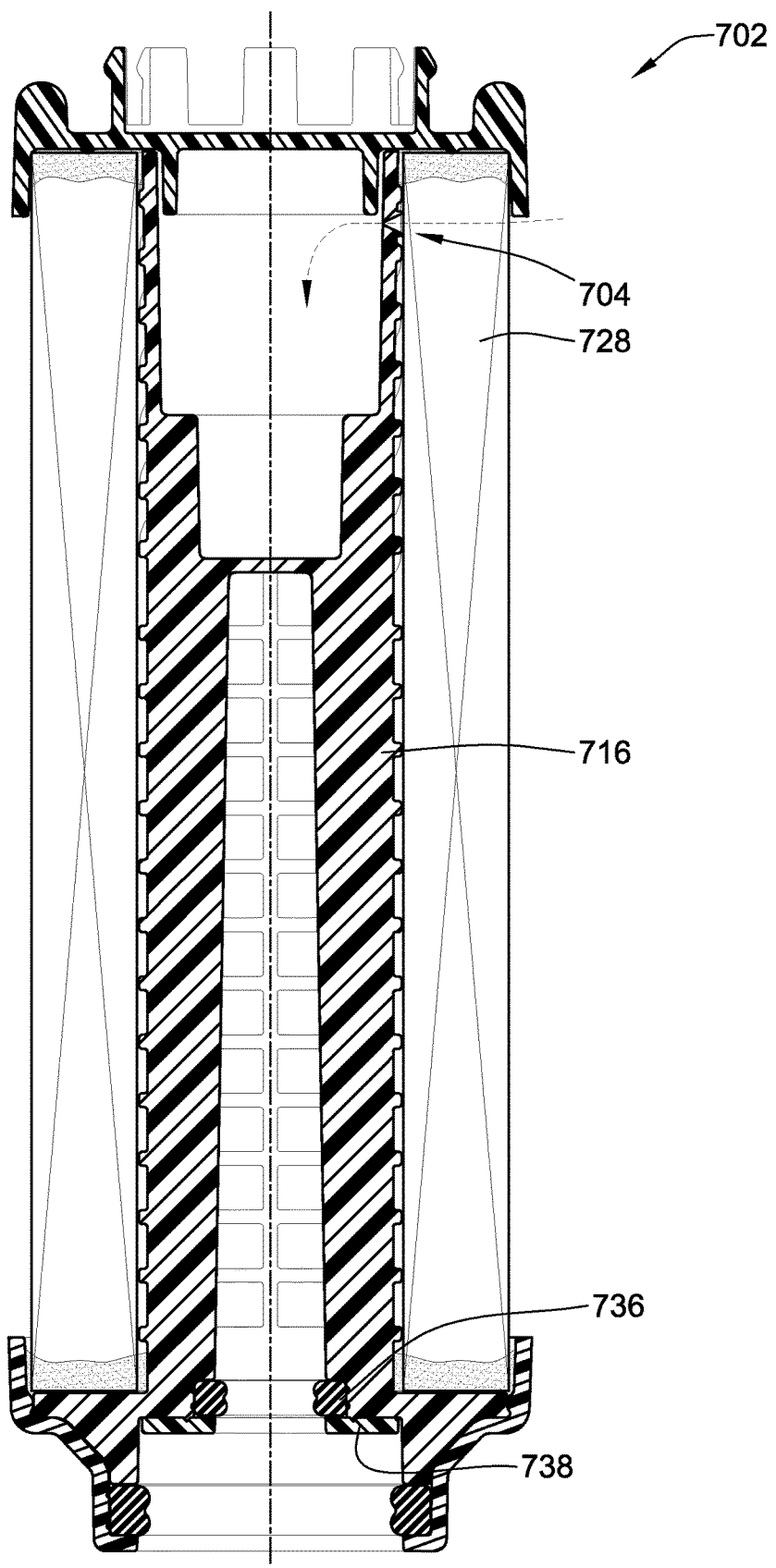

However, as illustrated in FIG. 16, the pressure on the downstream side of the check valve arrangement 780 is higher than upstream of the upstream side of the check valve arrangement 780, illustrated by arrow 790. This high pressure is the result of a potential back flow and causes the check valve arrangement 780 to transition to a closed state preventing back flow of fluid through the check valve arrangement 780. This prevents potential contaminants in the vent passage from passing back through the air bleed passage 722 and restriction 704 preventing contaminants from being exposed to a clean filter side of the filter element 702.

The floating ball 782 is preferably a low density plastic or rubber, however other alternative materials may be used such as metal.

The seat 786 preferably has a chamfered or generally conical profile in which the floating ball 782 is located. The conical profile of the seat 786 preferably widens in the downstream direction, i.e. fluidly away from the restriction 704. The narrowest portion of the seat 786, i.e. inlet throat 792, has a dimension that is smaller than the outer diameter of floating ball 782.

The floating ball 782 is axially secured proximate seat 786 by a retaining element, in the form of washer 738, which also functions to axially secure the second seal member 736 to the center tube 716.

Figure 18:
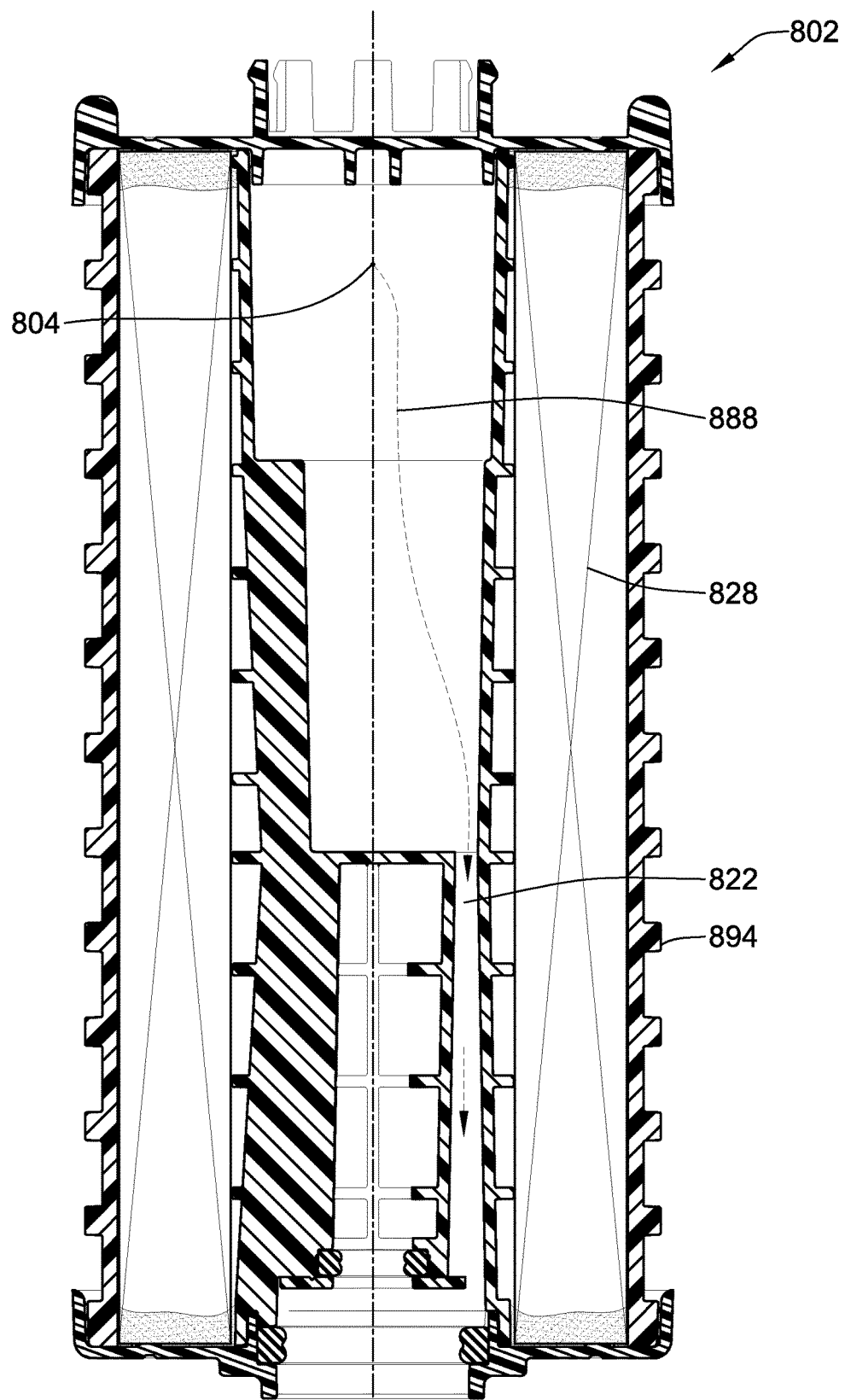
FIGS. 18 and 19 are cross-sectional illustrations of a further embodiment of a filter element according to an embodiment of the present invention.
Figure 19:
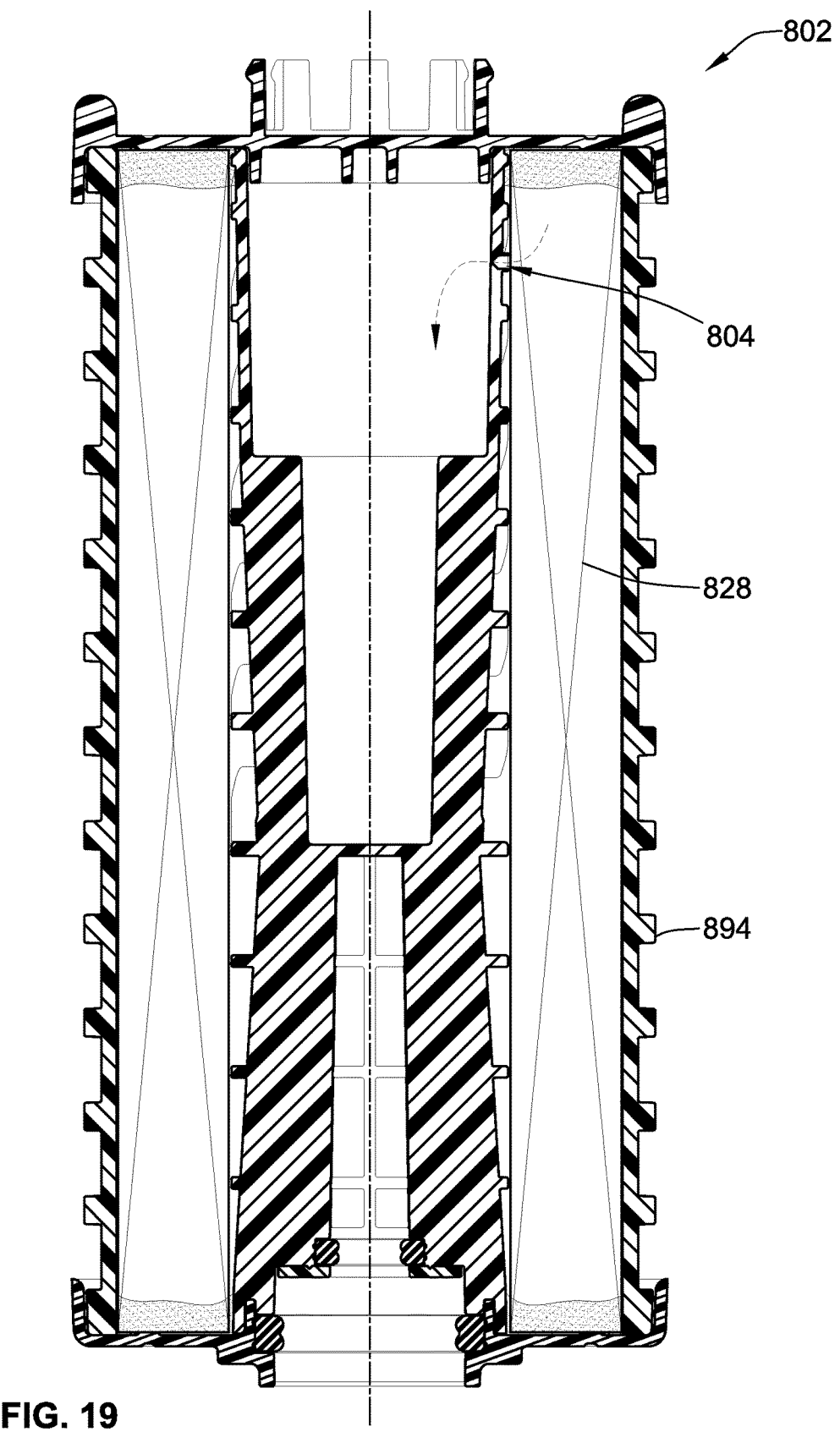

FIGS. 18 and 19 illustrate a further embodiment of a filter element 802 for use in a filter assembly according to the present invention.

Once again, the filter element 802 allows for venting of the filter assembly through the filter media 828 via the included restriction 804 that functions as a return air vent that allows air to pass through return air bleed passage 822 rather than through a clean fluid outlet during initial priming. This again assists in preventing undesirable air to enter the fuel system during maintenance activities.

Filter element 802 functions in substantially a same manner as filter element 402 described above. However, filter element 802 further includes a plastic wrapper 894 that provides support for the filter media 828.

Figure 20:
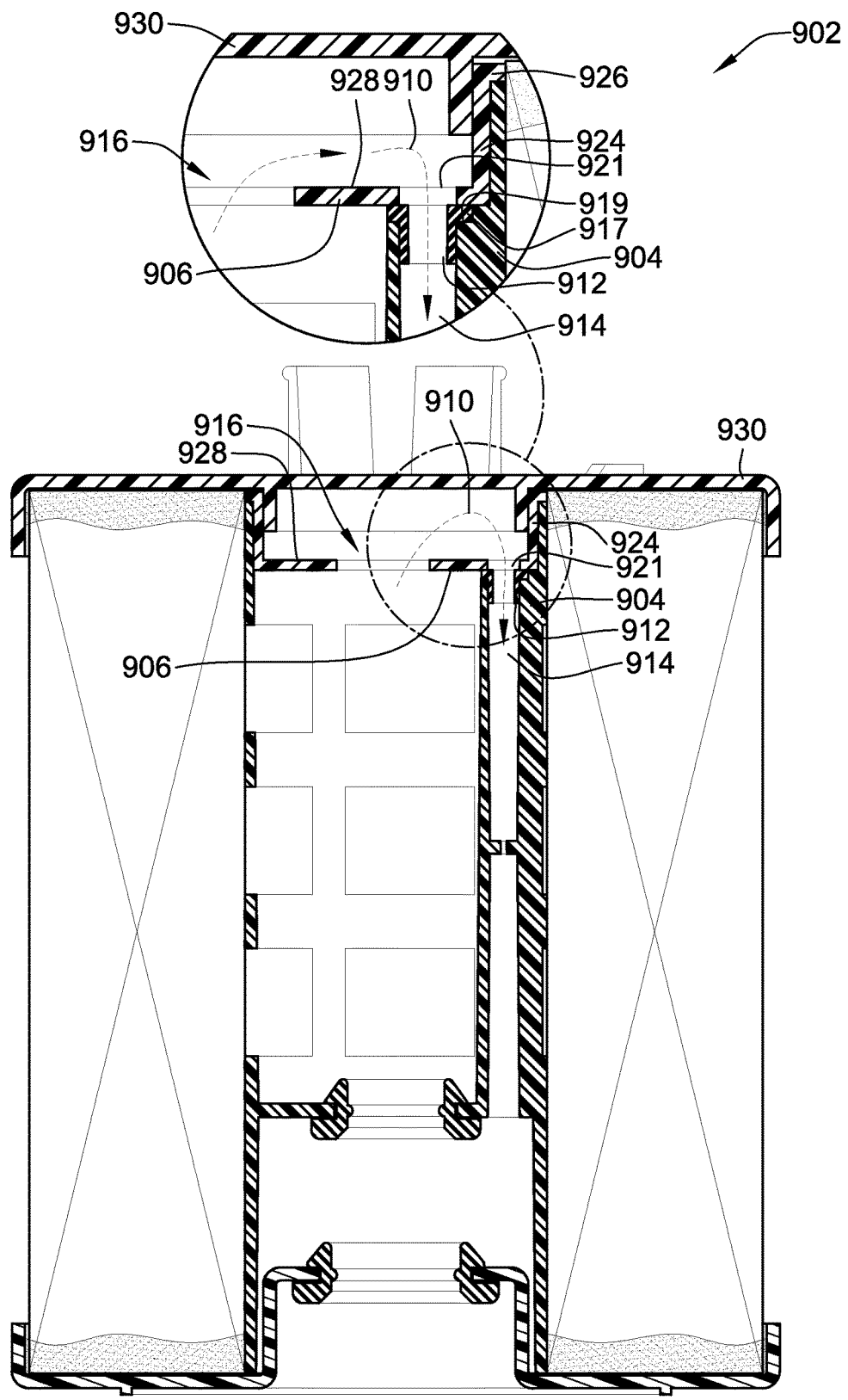
FIGS. 20 and 21 are cross-sectional illustrations of a further embodiment of a filter element according to an embodiment of the present invention.
Figure 21:
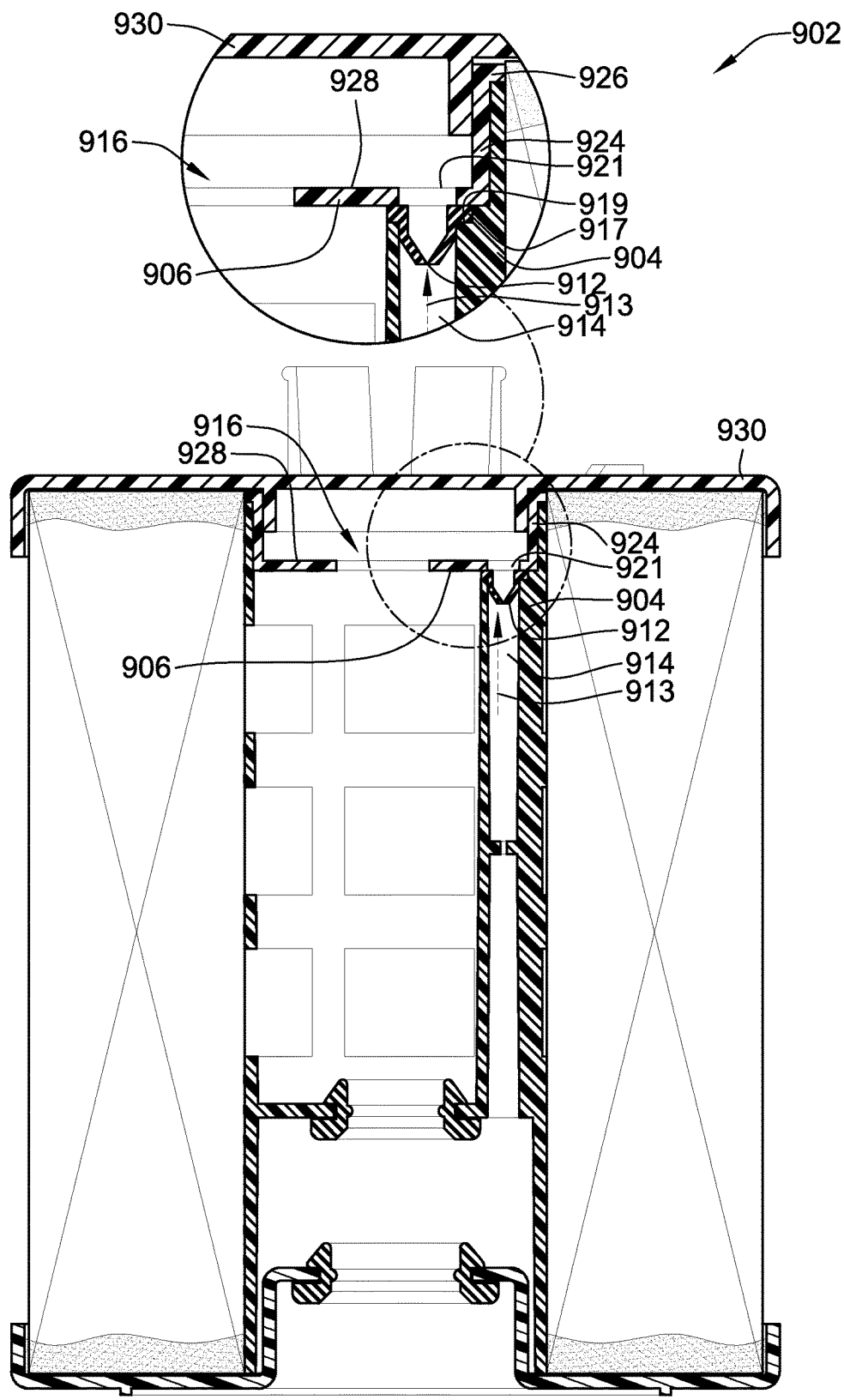

FIGS. 20 and 21 illustrate a further embodiment of a filter element 902 for use in a filter assembly according to the present invention. This embodiment is similar in many respects to the embodiment of FIG. 13. This embodiment utilizes a check valve 912 within the air bleed passage 914 that prevents back flow of fluid through the air bleed passage 914 to the clean fluid side of the filter media of the filter element 902.

The check valve 912 of the illustrate embodiment is a duck-billed valve that is formed from a resilient material, typically a resilient rubber. However, other flexible materials may also be used.

The check valve 912 is illustrated in FIG. 20 in the open state permitting fluid to flow therethrough, illustrated by arrows 910. This is during normal operation, such as during an initial priming step after initial installation to remove air from within the filter assembly. FIG. 21 illustrates the check valve 912 in a closed state where back pressure generated by reverse flowing fluid, illustrated by arrows 913 attempt to pass through the check valve 912.

The check valve 912 extends axially into the air bleed passage 914. A retainer plate 906 axially locates the check valve 912 within the air bleed passage 914. The retainer plate 906 includes at least one passage 916 that allows fluid to pass therethrough toward the check valve 912. The check valve 912 includes a radially extending annular flange portion 917 that rests on an axial abutment surface 919 of the center tube 904. The annular flange portion 917 is axially sandwiched between the abutment surface 919 and an inner surface of the retainer plate 906. The interactions between the annular flange portion 917 and retainer plate 906 as well as annular flange portion 917 and the abutment surface 918 provide seals that prevent fluid bypass.

The check valve 912 aligns with a second aperture 921 passing through the retainer plate 906 to permit the desired fluid flow, such as is illustrated in FIG. 20.

The retainer plate 906 generally has an axially extending annular sidewall 924 that has a radially outward extending mounting flange portion 926. Opposite the mounting flange portion 926, the annular sidewall 924 is attached to a disc portion 928 that defines apertures 816, 921. The annular sidewall 924 and disc portion 928 give the retainer plate a generally cup shape. The radially outward extending mounting flange portion 926 axially abuts a distal end of center tube 904 to axially limit the compression of annular flange portion 917. The radially outward extending mounting flange portion 926 is axially located between an inner surface of end cap 930 and the distal end of the center tube 914.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element for replaceable use with a filter head comprising:
    a ring of filter media defining an internal cavity;
    a main flow passage and a drain flow passage through the internal cavity, each flow passage having an inlet on a clean side of the filter media directly fluidly communicating with the internal cavity, wherein the drain flow passage and main flow passage are integrally attached to the ring of filter media such that the ring of filter media and the drain flow passage and the main flow passage are removed together from the filter head;
    a first seal portion defining an outlet from the internal cavity, and
    a second seal portion separating the main flow passage from the drain flow passage;
    wherein the drain flow passage includes a restriction sized large enough to allow air flow and small enough to prevent substantial liquid flow, wherein the restriction is removed from the filter head when the ring of filter media is removed from the filter head;
    further comprising a check valve arrangement in line with the drain flow passage limiting fluid flow through the drain flow passage to a single direction, wherein the check valve arrangement is removed from the filter head when the ring of filter media is removed from the filter head.

2. The filter element of claim 1, wherein the second seal portion defines a main flow passage outlet for the main flow passage; and
    wherein a drain flow passage outlet is provided between the first and second seal portions.

3. The filter element of claim 1, further comprising a central support within at least a portion of the internal cavity, the central support defining, at least in part, the drain flow passage, the check valve arrangement including a floating valve member positioned adjacent an outlet end portion of the drain flow passage.

4. The filter element of claim 1, wherein the first seal portion has an inner diameter that is larger than an inner diameter of the second seal portion, and the first and second seal portions are formed from separate discrete seal members that are axially spaced apart.

5. The filter element of claim 1, wherein the restriction is positioned between the drain flow passage inlet and a drain flow outlet.

6. The filter element of claim 1, wherein the filter element is configured such that fluid passing through both of the main flow passage and drain flow passage must also pass through the ring of filter media.

7. The filter element of claim 1, further comprising a central support, the central support defining, at least in part, the main flow passage and the drain flow passage, the central support being positioned, at least in part, within the internal cavity.

8. The filter element of claim 7, wherein the second seal portion is carried by the central support, the filter element further comprising a first end cap secured to a first end of the filter media, the first end cap carrying the first seal portion.

9. The filter element of claim 8, further comprising a second end cap, the second end cap secured to a second end of the filter media, the second end opposite the first end, the second end cap being imperforate.

10. The filter element of claim 7, wherein the second seal portion is axially positioned between a first abutment portion of the central support and a retaining member affixed to the central support.

11. The filter element of claim 10, wherein the first seal portion is axially positioned between a second abutment portion of the central support and an end cap secured to an end of the filter media.

12. The filter element of claim 1, wherein the check valve is a duck bill valve.

13. The filter element of claim 1, wherein the main flow passage and the drain flow passage are formed independent of the filter head.

14. A filter apparatus comprising:
a filter head including an inlet port, a main flow outlet port and a drain flow outlet port;
a filter element comprising:
  a ring of filter media defining an internal cavity;
  a main flow passage and a drain flow passage through the internal cavity, each flow passage having an inlet on a clean side of the filter media directly fluidly communicating with the internal cavity, wherein the drain flow passage and main flow passage are integrally attached to the ring of filter media such that the ring of filter media and the drain flow passage and the main flow passage are removed together from the filter head, the main flow passage fluidly coupled to the main flow outlet port, the drain flow passage fluidly coupled to the drain flow outlet port; and the filter media separating the inlet port from the main flow and drain flow outlet ports;
wherein the drain flow passage includes a restriction sized to permit gas flow but that is sized to substantially prohibit liquid flow, wherein the restriction is removed from the filter head when the ring of filter media is removed from the filter head; and
wherein the filter element further includes a check valve limiting fluid flow through the drain flow passage in a direction extending from the inlet thereof to the drain flow outlet port, wherein the check valve is removed from the filter head when the ring of filter media is removed from the filter head.

15. The filter apparatus of claim 14, wherein the filter head further includes a standpipe including an inner cylindrical tube defining the main flow outlet port, an outer cylindrical tube surrounding the inner cylindrical tube, the inner and outer cylindrical tubes defining the drain flow outlet port therebetween;
wherein the filter element further includes:
  a first seal member sealing with the outer cylindrical tube; and
  a second seal member sealing with the inner cylindrical tube.

16. The filter apparatus of claim 15, wherein the second seal member sealing with the inner cylindrical tube separates the main flow passage from a drain flow passage.

17. The filter apparatus of claim 15, wherein the second seal member has a smaller inner diameter than the first seal member.

18. The filter apparatus of claim 17, wherein both the inner and outer cylindrical tubes extend through the first seal member and only the inner cylindrical tube extends through the second seal member.

19. The filter apparatus of claim 15, wherein the first seal member seals the main flow outlet port to the main flow passage, the first and second seal members seal the drain flow passage outlet to the drain flow outlet port and the second seal portion prevents fluid from circumventing the filter media.

20. The filter apparatus of claim 14, wherein no fluid exiting the filter head via either the drain flow outlet port or the main flow outlet port circumvents the filter media.

21. The filter apparatus of claim 14, wherein the check valve is a duck bill valve.

22. The filter apparatus of claim 14, wherein the main flow passage and the drain flow passage are formed independent of the filter head.

* * * * *